(12) United States Patent
Wang et al.

(10) Patent No.: US 11,451,066 B2
(45) Date of Patent: Sep. 20, 2022

(54) CONTROL METHOD AND DEVICE FOR ACTIVE POWER OF WIND POWER PLANT CLUSTER

(71) Applicants: STATE GRID JIBEI ELECTRIC POWER COMPANY LIMITED, Beijing (CN); STATE GRID CORPORATION OF CHINA, Beijing (CN); TSINGHUA UNIVERSITY, Beijing (CN)

(72) Inventors: Jingran Wang, Beijing (CN); Bingxu Zhai, Beijing (CN); Rongfu Sun, Beijing (CN); Haibo Lan, Beijing (CN); Ruoyang Wang, Beijing (CN); Ran Ding, Beijing (CN); Haixiang Xu, Beijing (CN); Zhifeng Liang, Beijing (CN); Tao Lun, Beijing (CN); Zongxiang Lu, Beijing (CN); Chen Xu, Beijing (CN); Li Shu, Beijing (CN); Yu Shen, Beijing (CN); Xiaobo Wu, Beijing (CN)

(73) Assignee: STATE GRID JIBEI ELECTRIC POWER COMPANY LIMITED

( * ) Notice: Subject to any disclaimer, the term of this patent is extended or adjusted under 35 U.S.C. 154(b) by 923 days.

(21) Appl. No.: 16/090,677

(22) PCT Filed: Mar. 2, 2018

(86) PCT No.: PCT/CN2018/077864
§ 371 (c)(1),
(2) Date: Oct. 2, 2018

(87) PCT Pub. No.: WO2019/165637
PCT Pub. Date: Sep. 6, 2019

(65) Prior Publication Data
US 2021/0194252 A1 Jun. 24, 2021

(51) Int. Cl.
*H02J 3/48* (2006.01)
*F03D 7/02* (2006.01)
*H02J 3/38* (2006.01)

(52) U.S. Cl.
CPC .............. *H02J 3/48* (2013.01); *F03D 7/0284* (2013.01); *H02J 3/381* (2013.01); *F05B 2270/1033* (2013.01); *H02J 2300/28* (2020.01)

(58) Field of Classification Search
CPC .......... H02J 3/48; H02J 3/381; H02J 2300/28; F03D 7/0284; F05B 2270/1033
See application file for complete search history.

(56) References Cited

U.S. PATENT DOCUMENTS

2016/0061189 A1* 3/2016 Chen ..................... F03D 7/0284
290/44

FOREIGN PATENT DOCUMENTS

CN 102522781 A 6/2012
CN 104124715 A 10/2014
(Continued)

OTHER PUBLICATIONS

International Search Report dated Oct. 26, 2018; International Patent Application No. PCT/CN2018/077864.

*Primary Examiner* — Tulsidas C Patel
*Assistant Examiner* — Joseph Ortega
(74) *Attorney, Agent, or Firm* — McDonald Hopkins LLC

(57) ABSTRACT

Provided are a control method and a device for active power of a wind power plant cluster. The wind power plant cluster includes wind power plants of m priorities, wherein m is a positive integer. The control method includes: monitoring the consumption capability of a power grid in real time, and determining object active power of the wind power plant cluster according to the consumption capability of the power grid; determining a command active power of the wind (Continued)

power plant within each priority according to the object active power of the wind power plant cluster in a descending order of the priorities; and controlling real active power of the wind power plant within each priority according to the command active power.

12 Claims, 8 Drawing Sheets

(56) References Cited

FOREIGN PATENT DOCUMENTS

| | | |
|---|---|---|
| CN | 104467030 A | 3/2015 |
| CN | 105811472 A | 7/2016 |

* cited by examiner

CONTROL METHOD AND DEVICE FOR ACTIVE POWER OF WIND POWER PLANT CLUSTER

CROSS-REFERENCE TO RELATED APPLICATION

This application is a 35 U.S.C. 371 national stage filing of PCT Application No. PCT/CN2018/077864 filed on Mar. 2, 2018 which is incorporated herein in its entirety by reference.

TECHNICAL FIELD

Embodiments of the present application relate to a control technique for active power of a wind power plant cluster, and for example, relate to a control method and a device for active power of a wind power plant cluster.

BACKGROUND

Most of wind power plants are away from a load center, and thus need large-scale long-distance conveyance. Difficulty of peak regulation of a power grid is increased due to fluctuation and reverse peak regulation characteristics of the wind power plants, and a problem of wind power curtailment caused by the difficulty of peak regulation is increasingly obvious.

With respect to the control over the active power of the wind power plant cluster when peak regulation is difficult, a related control method is to limit wind power for each wind power plant at different periods of time after a certain safety margin is reserved according to consumption capability of the power grid, so that the active power of each wind power plant within one period of time is kept constant.

However, the active power of each wind power plant is constant within one period of time and thus cannot be rapidly regulated according to the consumption capability of the power grid. A power generation sequence of the wind power plants is not considered, causing that power generation capability of the wind power plants cannot be fully utilized.

SUMMARY

The present application provides a control method and a device for active power of a wind power plant cluster, so as to rapidly regulate the active power of wind power plants according to consumption capability of a power grid to fully utilize power generation capability of the wind power plants.

In a first aspect, embodiments of the present application provide a control method for active power of a wind power plant cluster. The wind power plant cluster includes wind power plants of m priorities, where m is a positive integer, and the control method includes:

monitoring the consumption capability of the power grid in real time, and determining object active power of the wind power plant cluster according to the consumption capability of the power grid;

determining a command active power of the wind power plant within each of the priorities according to the object active power of the wind power plant cluster in a descending order of the priorities; and controlling a real active power of the wind power plant within each of the priorities according to the command active power.

In a second aspect, embodiments of the present application provide a control device for active power of a wind power plant cluster. The wind power plant cluster includes wind power plants of m priorities, where m is a positive integer and the control device includes:

a determining module for object active power of a wind power plant cluster, which is configured to monitor the consumption capability of the power grid in real time, and determine the object active power of the wind power plant cluster according to the consumption capability of the power grid;

a command active power computing module, which is configured to determine command active power of the wind power plant within each of the priorities according to the object active power of the wind power plant cluster in a descending order of the priorities; and a control module, which is configured to a control real active power of the wind power plant within each of the priorities according to the command active power.

In the control method and device for the active power of the wind power plant cluster provided in embodiments of the present application, the wind power plants are classified into different priorities, so as to determine the object active power of the wind power plant cluster according to the consumption capability of the power grid detected in real time; then the command active power of the wind power plant within each priority is determined according to the object active power of the wind power plant cluster in the descending order of the priorities; and finally the real active power of the wind power plant within each priority is controlled according to the command active power. In a technical solution provided by embodiments of the present application, the active power of each wind power plant is rapidly controlled and regulated according to the consumption capability of the power grid detected in real time; and when the active power of each wind power plant is controlled and regulated, the priority of each wind power plant is considered and the power generation capability of each wind power plant is fully used, thereby solving a problem that the power generation capability of each wind power plant cannot be fully utilized.

DETAILED DESCRIPTION

The present application is described below in combination with drawings and embodiments. Embodiments described herein are merely used for explaining the present application, and not to limit the present application. For the convenience of description, drawings merely illustrate relevant parts of the present application, not all of structures.

Embodiment 1

Figure 1:
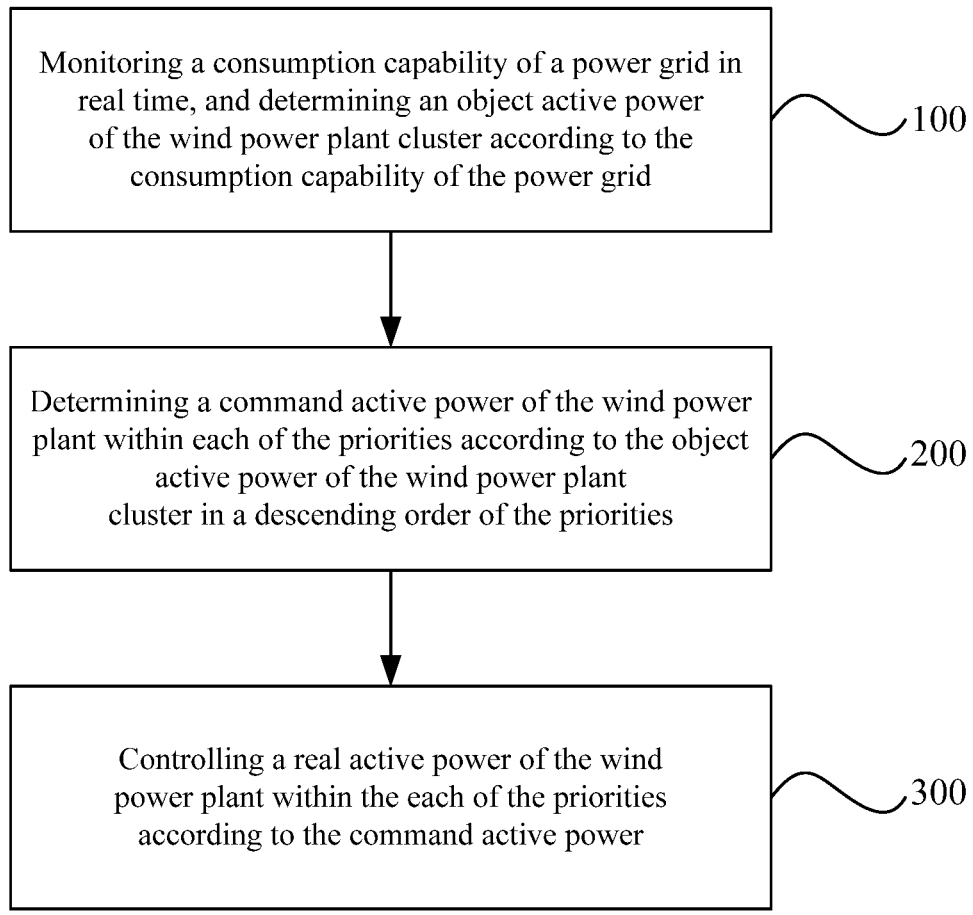
FIG. 1 is a flow chart illustrating a control method for active power of a wind power plant cluster provided by embodiment 1.

FIG. 1 is a flow chart illustrating a control method for active power of a wind power plant cluster provided by embodiment 1. The present embodiment is applicable to a case of controlling the active power of the wind power plant cluster when peak regulation is difficult. The control method can be executed by a control device for the active power of the wind power plant cluster. In the control method, the wind power plant cluster includes wind power plants of m priorities, where m is a positive integer. The control method includes the following steps:

Step 100: monitoring a consumption capability of a power grid in real time, and determining an object active power of the wind power plant cluster according to the consumption capability of the power grid.

Since an power load is not uniform, a generator set beyond normal operation shall be used for peak regulation. A generator set for peak regulation requires convenient and rapid start and stop, and easy synchronous regulation during grid connection. General generator sets for peak regulation include a gas turbine set, a pumped storage power set and the like. When power loads are different, the power grid has different consumption capabilities for power generation of new energy such as wind power and the like. That is, when the power loads are different, it is acceptable that active powers outputted by a power generation plant of new energy such as wind power are different. The control device for the active power of wind power plant cluster can monitor the consumption capability of the power grid in real time, and determine object active power of the wind power plant cluster according to the monitored consumption capability of the power grid. For example, if a power grid in a certain region only has one wind power plant cluster, when the consumption capability of the power grid is detected to be 500 MW, the object active power of the wind power plant cluster can be determined as 500 MW.

Step 200: determining a command active power of the wind power plant within each of the priorities according to the object active power of the wind power plant cluster in a descending order of the priorities.

For example, the wind power plant cluster includes wind power plants of three priorities, i.e., priority 1, priority 2 and priority 3, where the descending order of the priorities is successively priority 1, priority 2 and priority 3. The command active power of the wind power plant within each priority is allocated according to the descending order of the priorities. It is assumed that under normal conditions, total power generation active power of all wind power plants of the priority 1 can reach 300 MW, total power generation active power of all wind power plants of the priority 2 can reach 200 MW and total power generation active power of all wind power plants of the priority 3 can reach 100 MW. If the determined object active power of the wind power plant cluster is 500 MW, then the command active power of all the wind power plants of the priority 1 can be determined as 300 MW, the command active power of all the wind power plants of the priority 2 can be determined as 200 MW and the command active power of all the wind power plants of the priority 3 can be determined as 0 MW, so as to ensure that the wind power plants of high priority generate power at first.

Step 300: controlling a real active power of the wind power plant within the each of the priorities according to the command active power.

After the command active power of the wind power plant within each priority is determined, the control device for the active power of the wind power plant cluster controls the real active power of the wind power plant within each priority according to the command active power. For example, when determining that the command active power of all the wind power plants of the priority 1 is determined as 300 MW, the command active power of all the wind power plants of the priority 2 is determined as 200 MW and the command active power of all the wind power plants of the priority 3 is determined as 0 MW, then the control device issues the command active power to the wind power plant within each priority, so that the real active power of each wind power plant is close to the command active power until the real active power reaches the command active power value.

Based on the above technical solution, before monitoring the consumption capability of the power grid in real time, and determining the object active power of the wind power plant cluster according to the consumption capability of the power grid, the operation of the above step 100 may also include:

presetting a priority j for each wind power plant in the wind power plant cluster, where j=1, 2, . . . m, the priority of each wind power plant is regularly updated, and n wind power plants are included in the same priority, where n is a positive integer.

The above step defines the priority of each wind power plant in the wind power plant cluster, and provides a basis for allocation of the active power in the wind power plants within each priority in subsequent steps. It should be noted that, the prioritization shall accord with national policies on a premise of ensuring safe operation of the power grid, and shall protect legitimate rights and interests of each protocol party according to grid-connection scheduling protocols.

In the control method for the active power of the wind power plant cluster provided in the present embodiment, the wind power plants are classified into different priorities, so as to determine the object active power of the wind power plant cluster according to the consumption capability of the power grid detected in real time; then the command active power of the wind power plant within each priority is determined according to the object active power of the wind power plant cluster in the descending order of the priorities; and finally the real active power of the wind power plant within each priority is controlled according to the command active power. In the technical solution provided by the present embodiment, the active power of each wind power plant is rapidly controlled and regulated according to the consumption capability of the power grid detected in real time; and when the active power of each wind power plant is controlled and regulated, the priority of each wind power plant is considered and the power generation capability of each wind power plant is fully utilized, thereby solving a problem that the power generation capability of each wind power plant cannot be fully utilized.

Embodiment 2

Figure 2:
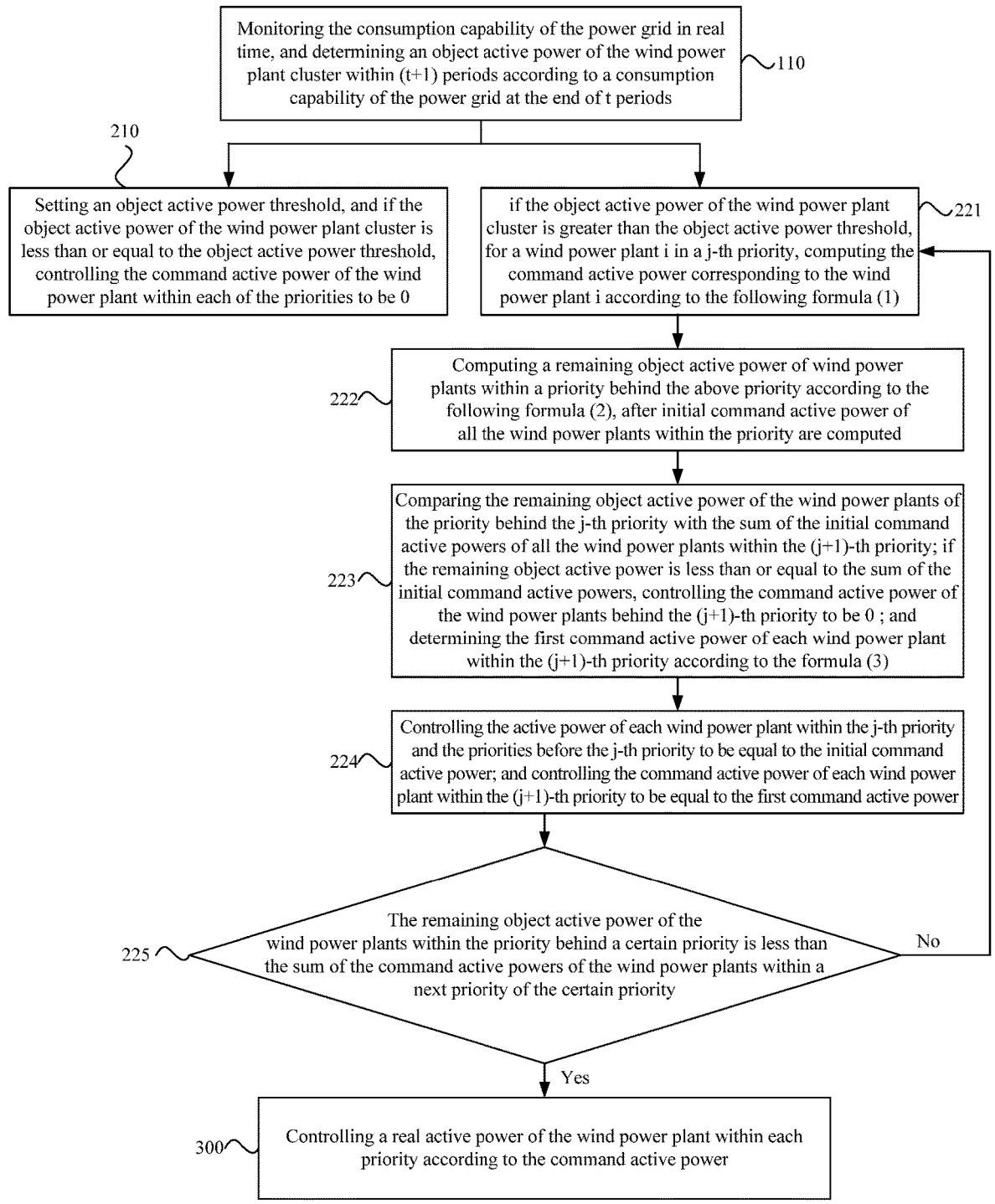
FIG. 2 is a flow chart illustrating a control method for active power of a wind power plant cluster provided by embodiment 2.

FIG. 2 is a flow chart illustrating a control method for active power of a wind power plant cluster provided by embodiment 2. Based on the technical solution of embodiment 1, the present embodiment provides an optional control method for active power of a wind power plant cluster. The control method is executed by a control device for active power of the wind power plant cluster.

Referring to FIG. 2, optionally, the operation of the step 100 provided in the above embodiment 1 includes:

Step 110: monitoring the consumption capability of the power grid in real time, and determining an object active power of the wind power plant cluster within (t+1) periods according to a consumption capability of the power grid at the end of t periods, where t is a positive integer.

Exemplarily, the control device for active power of the wind power plant cluster monitors the consumption capability of the power grid in real time, and computes the object active power of the wind power plant cluster at a fixed interval. The fixed interval can be regarded as a period. For example, if the object active power of the wind power plant cluster is computed once at a regular interval of five minutes, then the interval of five minutes can be regarded as a period. For example, if the object active power of the wind power plant cluster is computed from 0:00 on one day, then 0:00-0:05 is regarded as a first period and the object active power of the wind power plant cluster within a second period of 0:05-0:10 is determined according to the consumption capability of the power grid monitored finally at 0:05.

Optionally, for the operation of step 200 provided by the above embodiment 1, a step of determining the command active power of the wind power plant within each of the priorities according to the object active power of the wind power plant cluster in the descending order of the priorities includes:

Step 210: setting an object active power threshold, and if the object active power of the wind power plant cluster is less than or equal to the object active power threshold, controlling the command active power of the wind power plant within each of the priorities to be 0.

Exemplarily, when the object active power determined according to the consumption capability of the power grid is very small, a draught fan of each wind power plant in the wind power plant cluster may receive a shutdown signal again when it is started initially, causing rapid start and stop of the draught fan and affecting service life of the draught fan. Therefore, the object active power threshold may be set, for example, the object active power threshold is set as 1 MW, and then when the determined object active power of the wind power plant cluster is less than or equal to the object active power threshold of 1 MW, the control device judges that the wind power plant cluster does not need power generation and the command active power of the wind power plant within each of the priorities in the wind power plant cluster is set as 0.

Step 220: if the object active power of the wind power plant cluster is greater than the object active power threshold, the command active power of each wind power plant within each of the priorities is computed according to the following steps:

Step 221: for a wind power plant i in a j-th priority, computing the command active power corresponding to the wind power plant i according to the following formula (1):

$$P1_{i,t+1}^{ref} = P1_{i,t}^{real} + \Delta P_i, \quad i \in Nj, \; i=1,2,\ldots,n, \; j=1,2,\ldots,m;$$

Where $P1_{i,t+1}^{ref}$ is an initial command active power of the wind power plant i in the j-th priority within the (t+1) periods, and $P1_{i,t}^{real}$ is a real active power of the wind power plant i in the j-th priority at the end of the t periods; $\Delta P_i$ is a command step length of the wind power plant i in the j-th priority, and Nj is the j-th priority.

The command step length $\Delta P_i$ of the wind power plant i in the j-th priority can be determined according to installed capacity. The following solutions are described by taking 10% of an installed capacity value as the command step length $\Delta P_i$.

By taking the wind power plant cluster formed by seven wind power plants as an example, information such as the installed capacity of each wind power plant and the like can be seen in Table 1. Exemplarily, wind power plants A and B belong to the first priority; wind power plants C, D and E belong to the second priority; and wind power plants F and G belong to the third priority. The descending order of the priorities is successively the first priority, the second priority and the third priority.

TABLE 1

Active Command Table 1 of System Formed by Seven Wind Power Plants

| Priority | Wind Power Plant | Installed capacity/MW | t period command/MW | Active power at the end of t period/MW | (t + 1) periods command/MW |
|---|---|---|---|---|---|
| 1 | A | 50 | 30 | 30 | 35 |
|   | B | 200 | 120 | 120 | 140 |
| 2 | C | 120 | 100 | 100 | 112 |
|   | D | 60 | 50 | 50 | 56 |
|   | E | 180 | 150 | 150 | 168 |
| 3 | F | 80 | 65 | 65 | 73 |
|   | G | 100 | 85 | 85 | 95 |

In such a case that the object active power of the wind power plant cluster is greater than the object active power threshold, as shown in Table 1, for the wind power plant A within the first priority, the command active power of each wind power plant within each priority is computed according to the formula (1). For example, for the wind power plant A within the first priority, $P_{A,t}^{real}=30$ MW, $\Delta P_A=50*10\%=5$ MW, $P1_{A,t+1}^{ref}=P_{A,t}^{real}+\Delta P_A=30+5=35$ MW. Thus, the command active power of the wind power plant A within the first priority in the (t+1) periods can be computed as 35 MW according to the formula (1). Similarly, the initial command active power of other wind power plants can be computed according to the formula (1), as shown in Table 1.

Step 222: Computing a remaining object active power of wind power plants within a priority behind the above priority according to the following formula (2), after initial command active power of all the wind power plants within the priority are computed:

$$P_{j+1,t+1}^{obj} = P_{t+1}^{obj} - \sum_{i \in N_1 \cup N_2 \cup \ldots \cup N_j} P1_{i,t+1}^{ref}, \quad (2).$$

$$i \in Nj, \quad i = 1, 2, \ldots n, \quad j = 1, 2, \ldots m;$$

Where $P_{j+1,t+1}^{obj}$ is the remaining object active power of the wind power plants within the priority behind the j-th priority; $P_{t+1}^{obj}$ is the object active power of the wind power plant cluster; and $$\sum_{i \in N_1 \cup N_2 \cup \ldots \cup N_j} P1_{i,t+1}^{ref}$$

is a sum of initial command active powers of all the wind power plants within the j-th priority and priorities before the j-th priority.

For example, after the initial command active power of the wind power plant A of the first priority is computed as 35 MW and the initial command active power of the wind power plant B is computed as 140 MW, the remaining object active power value of the wind power plants of the second priority and the third priority behind the first priority is computed according to the formula (2). If the object active power of the wind power plant cluster in the (t+1) periods is determined as 500 MW according to the consumption capability of the power grid at the end of the t period, then the remaining object active power of the wind power plants within the second priority and the third priority is 500−(35+140)=325 MW.

Similarly, after the initial command active power of the wind power plant C of the second priority is computed as 112 MW, the initial command active power of the wind power plant D is computed as 56 MW and the initial command active power of the wind power plant E is computed as 168 MW, the remaining object active power value of the wind power plants of the third priority behind the second priority is computed according to the formula (2). If the object active power of the wind power plant cluster in the (t+1) periods is determined as 500 MW according to the consumption capability of the power grid at the end of the t period, then the remaining object active power of the wind power plants within the third priority is 500−(35+140)−(112+56+168)=−11 MW.

Step 223: comparing the remaining object active power $P_{j+1,t+1}^{obj}$ of the wind power plants of the priority behind the j-th priority with the sum $$\sum_{i \in N_{j+1}} P1_{i,t+1}^{ref}$$

of the initial command active powers of all the wind power plants within the (j+1)-th priority; if $$P_{j+1,t+1}^{obj} \leq \sum_{i \in N_{j+1}} P1_{i,t+1}^{ref},$$

then controlling the command active power of the wind power plants behind the (j+1)-th priority to be 0; and a first command active power of each wind power plant within the (j+1)-th priority is determined according to the following formula:

$$P1_{i,t+1}^{ref'} = \frac{P1_{i,t+1}^{ref}}{\sum_{i \in N_{j+1}} P1_{i,t+1}^{ref}} \times P_{j+1,t+1}^{obj}, \quad (3)$$

$$i \in Nj+1, \quad i = 1, 2, \ldots n, \quad j = 1, 2, \ldots m.$$

Where $P1_{i,t+1}^{ref'}$ is the first command active power of wind power plant i within the (j+1)-th priority; $P1_{i,t+1}^{ref}$ is an initial command active power of wind power plant i within the (j+1)-th priority;

$$\sum_{i \in N_{j+1}} P1_{i,t+1}^{ref}$$

is the sum of initial command active powers of all the wind power plants within the (+1)-th priority; and $P_{j+1,t+1}^{obj}$ is the remaining object active power of the wind power plants of the priority behind the j-th priority.

For example, the remaining object active power of the wind power plants of the second priority and the third priority behind the first priority is computed as 325 MW, the remaining object active power (325 MW) of the wind power plants of the second priority and the third priority is compared with the sum ((112+56+168)=336 MW) of the command active powers of all the wind power plants within a next priority (i.e., the second priority) of the first priority, 325<336; then the command active power of the wind power plants within the third priority behind the second priority is re-determined as 0, the corresponding initial command active powers are covered, i.e., the command active powers (73 and 95) of the wind power plants F and G, computed according to the formula (1), are updated as 0; and the first command active power of each wind power plant within the second priority is determined according to the formula (3). For example, for the wind power plant C within the second priority, according to the formula (3), the first command active power of the wind power plant C within the second priority is: $P1_{C,t+1}^{ref'}$=[112/(112+56+168)]*325=108.3 MW. Similarly, the first command active powers of the wind power plants D and E within the second priority can be determined as 54.2 MW and 162.5 MW, respectively.

Step 224: controlling the active power of each wind power plant within the j-th priority and the priority before the j-th priority to be equal to the initial command active power; and the command active power of each of the wind power plants within the (j+1)-th priority is controlled to be equal to the first command active power, as shown in the following formulas:

$$P_{i,t+1}{}^{ref}=P1_{i,t+1}{}^{ref}; i \in N1 \ldots Nj, i=1,2,\ldots n;$$

$$P_{i,t+1}{}^{ref}=P1_{i,t+1}{}^{ref}; i \in Nj+1, i=1,2,\ldots n;$$

where $P_{i,t+1}{}^{ref}$ is the command active power of the wind power plant i.

For example, the command active powers, computed according to the formula 1, of the wind power plants C, D and E within the second priority are updated according to the first command active powers (108.3 MW, 54.2 MW and 162.5 MW), determined in step 223, of the wind power plants C, D and E within the second priority. Finally, the command active power of each wind power plant computed according to step 221 to step 224 is obtained, as shown in Table 2.

TABLE 2

Active Command Table 2 of System Formed by Seven Wind Power Plants

| Priority | Wind Power Plant | Installed capacity/MW | t period command/MW | Active power at the end of t period/MW | (t + 1) periods command/MW |
|---|---|---|---|---|---|
| 1 | A | 50 | 30 | 30 | 35 |
|   | B | 200 | 120 | 120 | 140 |
| 2 | C | 120 | 100 | 100 | 108.3 |
|   | D | 60 | 50 | 50 | 54.2 |
|   | E | 180 | 150 | 150 | 162.5 |
| 3 | F | 80 | 65 | 65 | 0 |
|   | G | 100 | 85 | 85 | 0 |

Optionally, the wind power plant cluster includes wind power plants without up-regulation capability; and the determining the command active power of the wind power plant within each priority according to the object active power of the wind power plant cluster in the descending order of the priorities further includes: issuing a fixed command active power is issued to the wind power plants without up-regulation capability.

For example, the wind power plants which are operated early have major models of squirrel-cage asynchronous fans that do not have the capability to continuously regulate active power. Some new wind power plants are under grid-connection commissioning stage, and an active power control system is not used. The above two kinds of wind power plants do not have the capability of up-regulation for the active power, and the fixed command active power is issued thereto.

The control method further includes:

Step 225: repeatedly executing step 221 to step 224 until the remaining object active power of the wind power plants within the priority behind a certain priority is less than the sum of the command active powers of the wind power plants within a next priority of the certain priority.

Exemplarily, when the object active power of the wind power plant cluster is unchanged in multiple periods, if the object active powers within five consecutive periods after the t period are 750 MW, then within the (t+1) periods, according to the above formula (1) and formula (2), the initial command active powers of the wind power plants A and B within the first priority are 35 MW and 140 MW, respectively; the initial command active powers of the wind power plants C, D and E within the second priority are 112 MW, 56 MW and 168 MW, respectively; and the initial command active powers of the wind power plants F and G within the third priority are respectively 73 MW and 95 MW. The remaining object active power of the second priority and the third priority behind the first priority is 575 MW, and the remaining object active power of the third priority behind the second priority is 239 MW. In the present example, the third priority is the lowest priority. The sum of the initial command active powers of the wind power plants within this priority is: 73+95=168 MW. 168<239, which indicates that the object active power cannot be fully used by each wind power plant through the existing initial command active power. The control device issues active commands to the wind power plants according to the initial command active power of each wind power plant in the (t+1) periods. The above step 1 to step 4 are repeatedly executed in a (t+2) period. If in the (t+2) periods, the remaining object active power of a priority behind a certain priority is not less than the sum of the initial command active powers of each wind power plant within a next priority of the priority, then in this period, the control device issues the active commands to each wind power plant according to the initial command active power of each wind power plant in this period. The above step is repeated in this period until the remaining object active power of a priority behind a certain priority is less than the sum of the command active powers of each wind power plant within a next priority of the priority. For the above example, based on the command active power computed in the (t+1) period, the command active power is regulated according to the formula (1) in the (t+2) period, and a corresponding step length active power is added to each wind power plant. For example, for the wind power plant A within the first priority, the initial command active power in the (t+2) period is computed as: 35+5=40 MW. Similarly, for the wind power plants B, C, D, E, F and G, the initial command active powers in the (t+2) period are computed as: 160, 124, 62, 186, 81 and 105. According to the formula (2), the remaining object active power corresponding to the second priority and the third priority behind the first priority is computed as: 750−(40+160)=550 MW, the remaining object active power corresponding to the third priority behind the second priority is computed as: 750−(40+160)−(124+62+186)=178 MW, and the sum of the initial command powers of the wind power plants F and G within the third priority is 81+105=186 MW. 178 MW<186 MW, according to the formula (3), the first command active powers of the wind power plants F and G within the third priority are respectively $$P1_{F,t\to1}{}^{ref}=[81/(81+105)]*178=77.5 \text{ MW and}$$
$$P1_{G,t\to1}{}^{ref}=[105/(81+105)]*178=102.5 \text{ MW}.$$

Then, the initial command active power computed according to the formula (1) is updated according to the first command active powers of the wind power plants F and G within the third priority. In (t+3) to (t+5) periods in which the object active power of the wind power plant cluster is unchanged, the control device can issue the active commands according to the command active powers in the (t+2) period. After it is detected in a certain period that the object active power of the wind power plant cluster is changed, the above process is repeated.

TABLE 3

Active Command Table 3 of System Formed by Seven Wind Power Plants

| Priority | Wind Power Plant | Installed capacity/MW | t period command/MW | Active power at the end of t period/MW | (t + 1) period command/MW | (t + 2) period command/MW |
|---|---|---|---|---|---|---|
| 1 | A | 50 | 30 | 30 | 35 | 40 |
|   | B | 200 | 120 | 120 | 140 | 160 |
| 2 | C | 120 | 100 | 100 | 112 | 124 |
|   | D | 60 | 50 | 50 | 56 | 62 |
|   | E | 180 | 150 | 150 | 168 | 186 |
| 3 | F | 80 | 65 | 65 | 73 | 77.5 |
|   | G | 100 | 85 | 85 | 95 | 102.5 |

Step 300: controlling a real active power of the wind power plant within each priority according to the command active power. This step is the same as the step in the above embodiment 1, and will not be repeated herein.

It should be noted that, in one period, the control device issues the command active power once. Accordingly, each wind power plant regulates the real active power once according to the command active power.

In addition, if the consumption capabilities of the power grid in two adjacent periods are different, the real active power of each wind power plant is controlled directly according to the command active power computed in step 221 to step 224 in each period.

In the control method provided in the present embodiment, after the consumption capability of the power grid is determined, the active power of each wind power plant within each priority is regulated according to the command step length in the descending order of the priorities, so as to achieve a smooth regulation for the active power in each wind power plant. Thus, after the consumption capability of the power grid is determined, the active power of each wind power plant can be changed and the power generation capability of each wind power plant is fully utilized when peak regulation is difficult.

Embodiment 3

Figure 3:
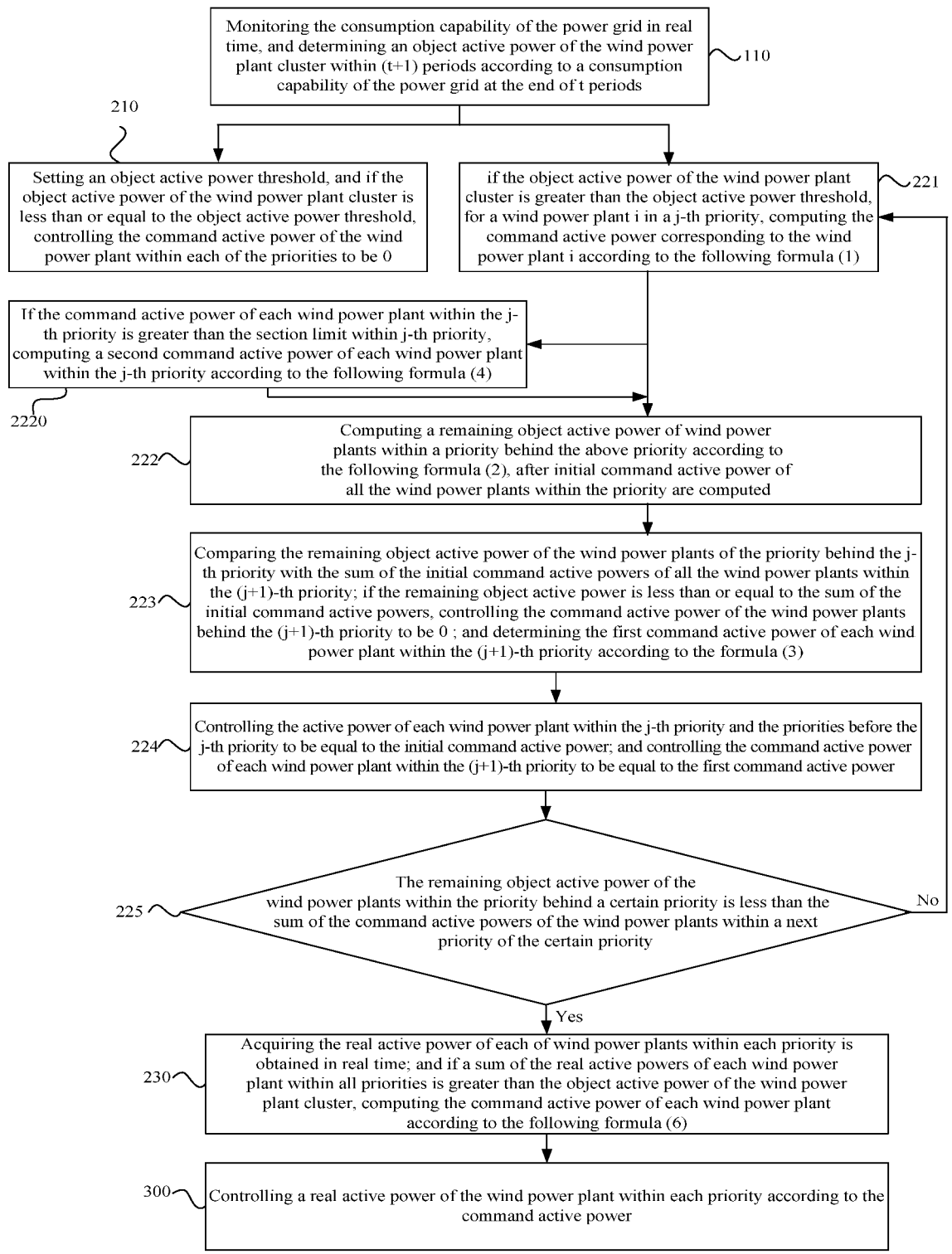
FIG. 3 is a flow chart illustrating a control method for active power of a wind power plant cluster provided by embodiment 3.

FIG. 3 is a flow chart illustrating a control method for active power of a wind power plant cluster provided by embodiment 3. The present embodiment is based on above embodiments and provides another control method for active power of a wind power plant cluster.

Optionally, each priority one respective section. The control method further includes: if the wind power plant cluster includes a section having a section limit, after the command power of each wind power plant is computed, the following step is executed:

Step 2220: if the command active power of each wind power plant within the j-th priority is greater than the section limit within j-th priority, computing a second command active power of each wind power plant within the j-th priority according to the following formula (4):

$$P_{i,t+1}^{ref''} = \frac{P_{i,t+1}^{ref}}{\sum_{i \in N_j} P_{i,t+1}^{ref}} \times P_{j,lim}, \ i = 1, 2, \ldots n, \ j = 1, 2, \ldots m; \quad (4).$$

Where $P_{i,t+1}^{ref''}$ is a second command active power of the wind power plant i within the j-th priority; $P_{i,t+1}^{ref}$ is a command active power of the wind power plant i within the j-th priority computed according to step 1 to step 4;

$$\sum_{i \in N_j} P_{i,t+1}^{ref}$$

is a sum of command active powers of all the wind power plants within the j-th priority; and $P_{j,lim}$ is the section limit within the j-th priority.

The command active power of the wind power plant i within the j-th priority is updated according to the second command active power.

Optionally, the operation of determining the command active power of the wind power plant within each priority according to the object active power of the wind power plant cluster in the descending order of the priorities in step 200 in the above embodiment 1 further includes:

setting an object active power increasing threshold, if the object active power of the wind power plant cluster is greater than the object active power threshold and a difference between the object active power of the wind power plant cluster in the (t+1) periods and the object active power of the wind power plant cluster in the t period is greater than the object active power increasing threshold through computation, comparing the object active power of the wind power plant cluster in the (t+1) periods with a sum of the section limits in the descending order of the priorities, and when the object active power of the wind power plant cluster in the (t+1) periods is greater than the sum of section limits within the j-th priority and the priorities before the j-th priority, and less than or equal to the sum of section limits within the (j+1)-th priority and the priorities before the (j+1)-th priority, the command active powers of the first priority to the j-th priority are clamped to the section limits corresponding to each priority, and the remaining object active power of the wind power plants within the priorities behind the j-th priority is computed according to the following formula:

$$P_{j+1,t+1}^{obj} = P_{t+1}^{obj} - \sum_{j \in M'} P_{j,lim} - \sum_{j \in M''} \sum_{i \in Nj} P_{i,t+1}^{ref}, \quad (5)$$

$$i = 1, 2, \ldots n, \quad j = 1, 2, \ldots m.$$

In the formula, M' is a set of all the sections with the up-regulation capability, and M" is a set of all the sections without the up-regulation capability.

The control method provided by the present embodiment is described continuously by taking the wind power plant cluster formed by seven wind power plants as an example. Basic information such as section limit, installed capacity and the like is shown in Table 4, where the wind power plants A and B deliver through section 1 and are constraint by the section limit, and 40% of power generation capacity is limited; the wind power plants C, D and E deliver through section 2, 17% of power generation capacity is limited and the wind power plant C is assumed as the wind power plant which does not use an active control system; and the wind power plants F and G deliver through section 3, and is not limited. The order of the priorities is: section 1-section 2-section 3. The command step length of the wind power plant is 10% of installed capacity. Optionally, when an increase rate of the real active power of the wind power plant in the t period is greater than half of the step length, it is judged that the section has the up-regulation capability in the (t+1) period.

1) When the consumption capability of the power grid is decreased, the control method is executed as follows: the total active power of all the wind power plants at the end of the t period is 600 MW; at (t+1) time, power is limited due to the constraint of peak regulation; under the influence of peak regulation of the power grid, the power grid can consume the total power of the wind power of 300 MW, i.e., the object active power of the wind power plant cluster is 300 MW. According to a proportion of the installed capacity, the command active power of the wind power plant C is computed as 50 MW. The object active power of the section 1 is:

$$P_{1,t+1}^{obj} = 300 - 50 = 250 \text{ MW}.$$

Based on the order of the priorities, the initial command active powers of the wind power plants A and B within the first priority are computed at first, and the following values are obtained through the formula (1):

$$P1_{A,t+1}^{ref} = 30 + 5 = 35 \text{ MW and } P1_{A,t+1}^{ref} = 120 + 20 = 140 \text{ MW}.$$

Since the sum of the initial command active powers of each wind power plant within the priority is greater than the section limit of each wind power plant within the priority, according to the formula (4), the corrected second command active power of the wind power plant A is: $P_{A,t+1}^{ref''} = [35/(35+140)]*150 = 30$ MW, and the corrected second command active power of the wind power plant B is: $P_{A,t+1}^{ref''} = [140/(35+140)]*150 = 120$ MW.

Then, the object active power of the section 2 can be computed as:

$$P_{2,t+1}^{obj} = 250 - 150 = 100 \text{ MW}.$$

According to the formula (1), the initial command active powers of the wind power plants C, D and E in the section 2 are respectively computed as 50 MW, 56 MW and 168 MW, and the sum 274 MW is greater than 100 MW, indicating that the remaining object active power for peak regulation will not completely used in this priority. According to the formula (3), the first command active powers of the wind power plants D and E are computed as:

$$P1_{D,t+1}^{ref'} = 1 = 25 \text{ MW and } P1_{E,t+1}^{ref'} = 75 \text{ MW}.$$

The command of the wind power plant within each of subsequent priorities is 0:

$$P_{F,t+1}^{ref} = P_{G,t+1}^{ref} = 0.$$

2) When the consumption capability of the power grid is increased, the control method is executed as follows:

it is assumed that an object value of peak regulation of the power grid is increased from 300 MW at the end of t' periods to 500 MW at the start of (t'+1) periods, that is, the object active power of the wind power plant cluster is increased from 300 MW to 500 MW. It is assumed that the fixed command of the wind power plant C at this moment is adjusted as 100 MW. The sections 1, 2 and 3 are assumed to have the up-regulation capability, and the object active power increasing threshold is 100 MW. According to the above conditions, the difference between $P_{t'+1}^{obj}$ and $P_{t'}^{obj}$ is 200 MW, and is greater than the object active power increasing threshold of 100 MW. Then according to the above step 200, it can be known that:

the object active power of the section 1 is the section limit, $$P_{1,t'+1}^{obj} = 150 \text{ MW}.$$

According to the formulas (1) and (4), the command active powers of the wind power plants A and B can be computed, $$P1_{A,t'+1}^{ref} = 30 \text{ MW and } P1_{B,t'+1}^{ref} = 120 \text{ MW}.$$

The object active power of the section 2 is the section limit, $$P_{2,t'+1}^{obj} = 300 \text{ MW}.$$

The initial command active powers of the wind power plants D and E can be computed according to the formula (1):

$$P1_{D,t'+1}^{ref} = 25 + 6 = 31 \text{ MW and } P1_{E,t'+1}^{ref} = 75 + 18 = 93 \text{ MW}.$$

If the wind power plants D and E always have the up-regulation capability, the active command will be increased according to the formula (2) until the section 2 reaches the limit.

According to the formula (5), the object active power of the section 3 can be computed as:

$$P_{3,t'+1}^{obj} = 500 - 150 - 300 = 50 \text{ MW}.$$

According to the formula (1), the initial command active powers of the wind power plants F and G can be computed as:

$$P_{F,t'+1}^{ref} = 8 \text{ MW and } P_{G,t'+1}^{ref} = 10 \text{ MW}.$$

If the wind power plants F and G always have the up-regulation capability, the active command will be increased according to the formula (2) until the object active power is fully used. Finally, the command active powers in the (t+1) period computed according to the above method are obtained, as shown in Table 4.

TABLE 4

Active Command Table 4 of System Formed by Seven Wind Power Plants

| Section (Limit/MW) | Wind Power Plant | Active control system state | Installed capacity/MW | t period command/MW | Active power at the end of t period/MW | Up-regulation capability in (t + 1) period/MW |
|---|---|---|---|---|---|---|
| Section 1 (150) | A | Yes | 50 | 30 | 30 | Yes |
|  | B | Yes | 200 | 120 | 120 | Yes |
| Section 2 (300) | C | No | 120 | 100 | 100 | — |
|  | D | Yes | 60 | 50 | 50 | Yes |
|  | E | Yes | 180 | 150 | 150 | Yes |
| Section 3 (200) | F | Yes | 80 | 65 | 65 | No |
|  | G | Yes | 100 | 85 | 85 | No |

| Section (Limit/MW) | Command in (t + 1) period/MW | Real active power at the end of t' period after several periods/MW | Up-regulation capability in (t' + 1) period | Command in (t' + 1) period/MW | Real active power at the end of (t' + 1) period/MW |
|---|---|---|---|---|---|
| Section 1 (150) | 30 | 30 | Yes | 30 | 30 |
|  | 120 | 120 | Yes | 120 | 120 |
| Section 2 (300) | 50 | 50 | — | 100 | 100 |
|  | 25 | 25 | Yes | 31 | 31 |
|  | 75 | 75 | Yes | 93 | 93 |
| Section 3 (200) | 0 | 0 | Yes | 8 | 8 |
|  | 0 | 0 | Yes | 10 | 10 |

Based on the above solution, before the operation of controlling real active power of the wind power plant within each priority according to the command active power in step 300, the control method further includes:

Step 230: acquiring the real active power of each of wind power plants within each priority is obtained in real time; and if a sum of the real active powers of each wind power plant within all priorities is greater than the object active power of the wind power plant cluster, the command active power of each wind power plant is computed according to the following formula (6):

$$P_{i,t+1}^{ref''''} = \frac{P_{i,t+1}^{real}}{\sum_{i \in N} P_{i,t+1}^{real}} \times P_{i,t+1}^{obj}, \quad (6)$$

$$i = 1, 2, \ldots n, \quad j = 1, 2, \ldots m.$$

where $P_{i,t+1}^{ref''''}$ is a fourth command active power of the wind power plant i; $P_{i,t+1}^{real}$ is a real active power of the wind power plant i;

$$\sum_{i \in N} P_{i,t+1}^{real}$$

is a sum of real active powers of the wind power plant cluster; and $P_{i,t+1}^{obj}$ is the object active power of the wind power plant cluster.

The command active power of each wind power plant of the wind power plant cluster is updated according to the fourth command active power.

For example, the real active powers of the wind power plants A, B, C, D, E, F and G in the wind power plant cluster in the (t'+1) periods are respectively 32 MW, 125 MW, 100 MW, 35 MW, 95 MW, 10 MW and 15 MW, and the sum of the real active powers of each wind power plant is 520 MW and is greater than the object active power of the wind power plant cluster of 500 MW. Then, the command active power in the (t'+1) periods is recomputed according to the above formula (6) and is used as the fourth command active power. According to the formula (6), the following value can be obtained:

$$P_{A,t+1}^{ref''''} = (32/520)*500 = 30.77 \text{ MW.}$$

Similarly, the fourth command active power of each of other wind power plants in the wind power plant cluster can be successively computed, and the computed command active power of each wind power plant in this period is updated according to the fourth command active power. Therefore, a problem that the total real active power of the wind power plant cluster when a sudden gust appears is greater than the object active power of the wind power plant cluster and a problem of increasing peak regulation difficulty are avoided.

Accordingly, when the above case exists, the control device issues mandatory trigger commands to each wind power plant so that each wind power plant regulates the real active power according to the above fourth command active power. It should be noted that, in one period, a frequency threshold for issuing the mandatory trigger commands may be set. When occurring times of the above case exceeds the frequency threshold, the mandatory trigger commands will not be issued.

In the control method for active power of the wind power plant cluster provided by the present embodiment, on a premise of considering the consumption capability of the power grid, the section limit of the corresponding section within each priority is considered, thereby achieving coordinated control of the active power of the wind power plant under the joint action of peak regulation constraint of the power grid and the section constraint. Moreover, when the consumption capability of the power grid is rapidly increased, it is ensured that the active power of the wind power plant with high priority is increased at first and then the active power of the wind power plant with low priority is increased, thereby avoiding a phenomenon that the wind power plant with low priority rapidly starts and stops the fan when the consumption capability of the power grid is rapidly increased. In addition, when the sum of the real active powers of the wind power plant cluster is greater than the object active power, the command active power is recomputed and the mandatory trigger commands are issued to each wind power plant according to the command active power, thereby avoiding a problem that the total real active power of the wind power plant cluster when a sudden gust appears is greater than the object active power of the wind power plant cluster and a problem of increasing peak regulation difficulty.

Embodiment 4

Figure 4:
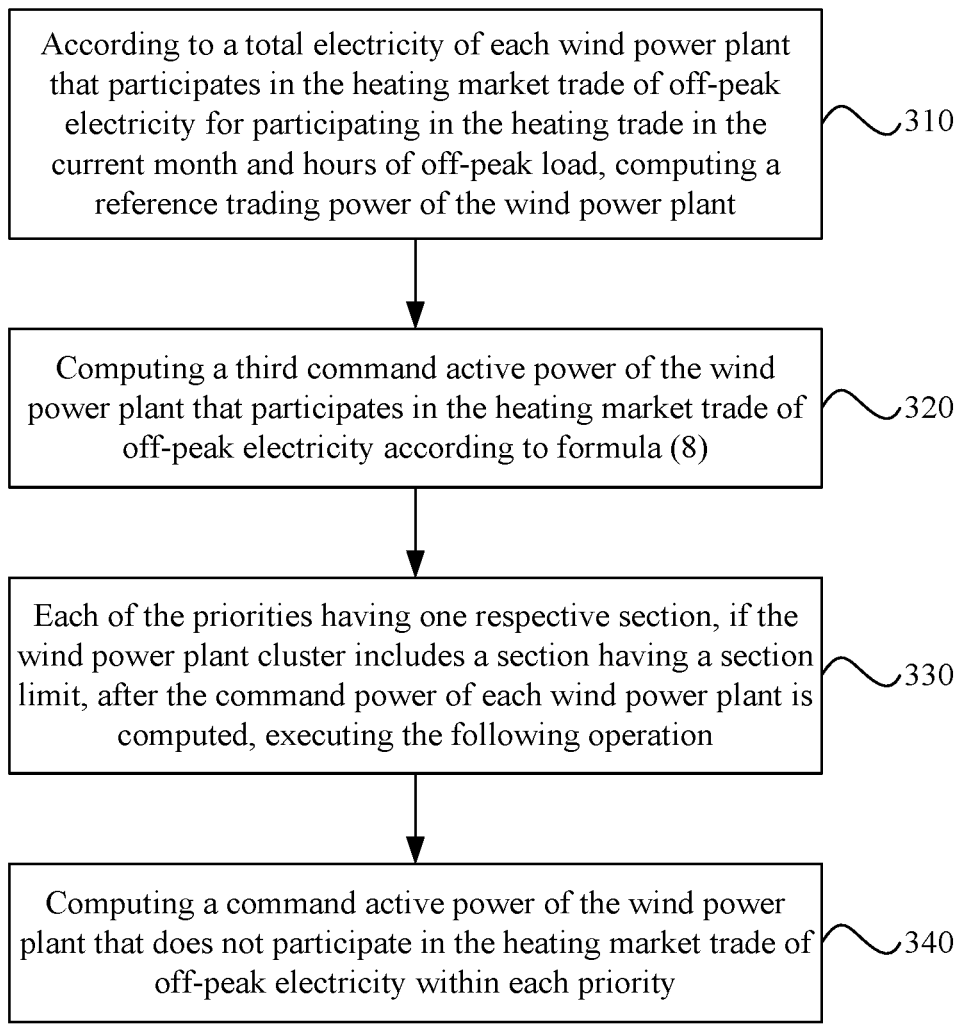
FIG. 4 is a flow chart illustrating a control method for active power of a wind power plant cluster provided by embodiment 4.

FIG. 4 is a flow chart illustrating a control method for active power of a wind power plant cluster provided by embodiment 4. Based on above embodiment 2, the present embodiment provides another control method for active power of a wind power plant cluster.

In a practical power supply case, some or all of wind power plants in the wind power plant cluster may participate in heating market trade in a off-peak load period. When a wind power plant within the priority participates in the heating market trade of off-peak electricity, electricity trade must be ensured to complete at first, and meanwhile, an increase after the wind power plant participates in the heating electricity trade shall be reflected in command output active power.

Optionally, if the wind power plant cluster includes a wind power plant which participates in the heating market trade of off-peak electricity, the command active power of the wind power plant within each priority is determined according to the object active power of the wind power plant cluster in the descending order of the priorities, including:

step 310: according to a total electricity of each wind power plant that participates in the heating market trade of off-peak electricity for participating in the heating trade in the current month and hours of off-peak load, computing a reference trading power of the wind power plant through following formula:

$$L_i = \frac{Q_i}{T}; \qquad (7)$$

where $L_i$ represents the reference trading power of the wind power plant i in the current month; $Q_i$ represents a total electricity of the wind power plant i that participates in the heating market trade in the current month; and T represents hours of off-peak load of the wind power plant i in the current month.

At the end of each month, the total electricity and off-peak hours for participating in the heating trade in a next month can be predicted according to historical data. For example, if the total electricity for the heating trade is 3000 MW and the off-peak hours are 150 hours, then the reference trading power of the wind power plant is 3000/15=20 MW according to the formula (7). Each wind power plant that participates in the heating trade has a certain power supply index. The power supply index may be an active power when the wind power plant participates in the h heating trade of off-peak electricity. The active power of the wind power plant is computed according to the power supply index, including the following steps:

Step 320: computing a third command active power of the wind power plant that participates in the heating market trade of off-peak electricity according to the following formula (8):

$$P_{i,t+1}^{ref''}=P_{i,t+1}^{ref}+L_i \qquad (8).$$

Where $P_{i,t+1}^{ref''}$ is the third command active power of the wind power plant that participates in the heating market trade of off-peak electricity; and P is the command active power of the wind power plant that participates in the heating market trade of off-peak electricity computed according to step 1 to step 4.

By taking the wind power plant cluster formed by seven wind power plants in embodiment 2 as an example, information such as the installed capacity of each wind power plant and the like can be seen in Table 5. Exemplarily, wind power plants A and B belong to the first priority; wind power plants C, D and E belong to the second priority; and wind power plants F and G belong to the third priority. The descending order of the priorities is successively the first priority, the second priority and the third priority. For example, it is assumed that the object active power of the wind power plant cluster in the (t+1) period is determined as 500 MW according to the consumption capability of the power grid at the end of the t period. After computation according to step 221 to step 224, see Table 2 in embodiment 2 for the command active power of each wind power plant. If the wind power plant A within the first priority participates in the heating trade and is assigned with a heating trade index of 10 MW and the wind power plant C within the second priority participates in the heating trade and is assigned with a heating trade index of 10 MW, then according to the formula (8): the third command active power of the wind power plant A is 35+10=45 MW, and the third command active power of the wind power plant C is 108.3+10=118.3 MW.

Step 330: each of the priorities having one respective section, if the wind power plant cluster includes a section having a section limit, after the command power of each wind power plant is computed, executing the following operation:

if a command active power of each wind power plant within the j-th priority is greater than the section limit within the j-th priority, computing a second command active power of each wind power plant within this priority according to the following formula:

$$P_{i,t+1}^{ref''} = \frac{P_{i,t+1}^{ref}}{\sum_{i \in N_j} P_{i,t+1}^{ref}} \times P_{j,lim}, i = 1, 2, \ldots n, \; j = 1, 2, \ldots m; \qquad (9).$$

Where $P_{i,t+1}^{ref''}$ is a second command active power of the wind power plant i within the j-th priority; $P_{i,t+1}^{ref}$ is a command active power of the wind power plant i within the j-th priority computed according to step 1 to step 4;

$$\sum_{i \in N_j} P_{i,t+1}^{ref}$$

is a sum of command active powers of all the wind power plants within the j-th priority; and $P_{j,lim}$ is the section limit within the j-th priority.

The command active power of the wind power plant i within the j-th priority is updated according to the second command active power.

Step 340: computing a command active power of the wind power plant that does not participate in the heating market trade of off-peak electricity within each priority.

Before computing the command active power of the wind power plant that does not participate in the heating market trade of off-peak electricity, an object active power of the wind power plant that does not participate in the heating market trade of off-peak electricity within a priority of the wind power plant that participates in the heating market trade of off-peak electricity is corrected through the following formula:

$$P_{j,t+1}^{obj*} = P_{j,t+1}^{obj} - \sum_{i \in NL} P_{i,t+1}^{ref'''}. \quad (10)$$

Where $P_{j,t+1}^{obj'}$ is the object active power of the wind power plant that does not participate in the heating market trade of off-peak electricity within the priority of the wind power plant that participates in the heating market trade of off-peak electricity; $P_{j,t+1}^{obj}$ is an object active power of all the wind power plants within the priority of the wind power plant that participates in the heating market trade of off-peak electricity; and NL represents a set of the wind power plants that participate in the heating market trade of off-peak electricity within the j-th priority.

In the control method for the active power of the wind power plant cluster provided by the present embodiment, on a premise of considering the consumption capability of the power grid, not only the section limit of the section corresponds to each priority is considered, but also the increase after the heating trade electricity is reflected in the command active power of the wind power plant that participates in the heating trade when the wind power plant participates in the heating market trade of off-peak electricity in the off-peak load period, thereby achieving coordinated control of the active power of the wind power plant under the joint action of peak regulation constraint of the power grid, the section constraint and the market trade.

Embodiment 5

Figure 5:
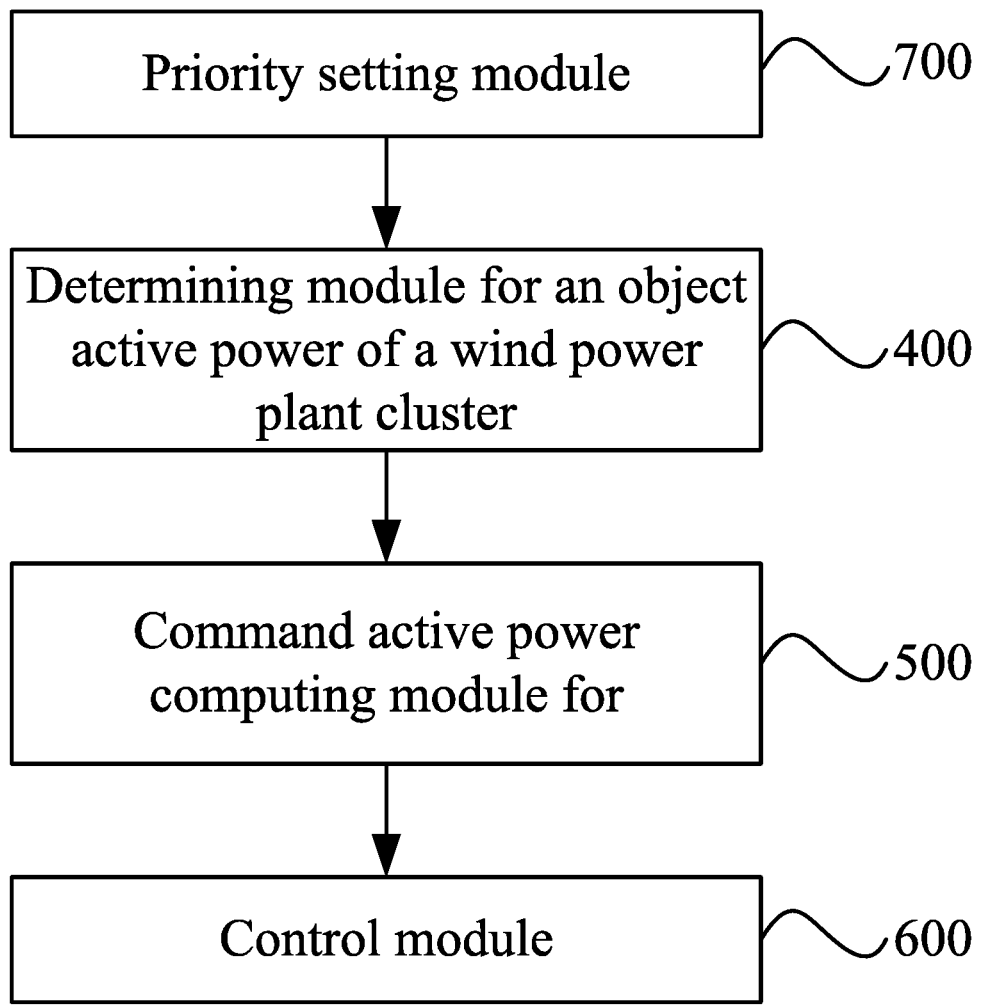
FIG. 5 is a structural diagram illustrating a control device for active power of a wind power plant cluster provided by embodiment 5.

FIG. 5 is a structural diagram illustrating a control device for active power of a wind power plant cluster provided by embodiment 5. The control device can execute the control method provided in any of above embodiments. The wind power plant cluster includes wind power plants of m priorities, where m is a positive integer. The control device includes:

a determining module 400 for object active power of a wind power plant cluster, which is configured to monitor a consumption capability of a power grid in real time, and determine object active power of the wind power plant cluster according to the consumption capability of the power grid;

a command active power computing module 500, which is configured to determine command active power of the wind power plant within each priority according to the object active power of the wind power plant cluster in a descending order of the priorities; and a control module 600, which is configured to control real active power of the wind power plant within each priority according to the command active power.

Optionally, the control device further includes: a priority setting module 700, which is configured to preset the priority j for each wind power plant in the wind power plant cluster, where j=1, 2, ... m, the priority of each wind power plant is regularly updated and n wind power plants are within in the same priority, where n is a positive integer.

In the control device for the active power of the wind power plant cluster provided in the present embodiment, the wind power plants are classified into different priorities, so as to determine the object active power of the wind power plant cluster according to the consumption capability of the power grid detected in real time; then the command active power of the wind power plant within each priority is determined according to the object active power of the wind power plant cluster in the descending order of the priorities; and finally the real active power of the wind power plant within each priority is controlled according to the command active power. In the technical solution provided by embodiments of the present application, the active power of each wind power plant is rapidly controlled and regulated according to the consumption capability of the power grid detected in real time; and when the active power of each wind power plant is controlled and regulated, the priority of each wind power plant is considered and the power generation capability of each wind power plant is fully utilized, thereby solving a problem that the power generation capability of each wind power plant cannot be fully utilized.

Embodiment 6

Figure 6:
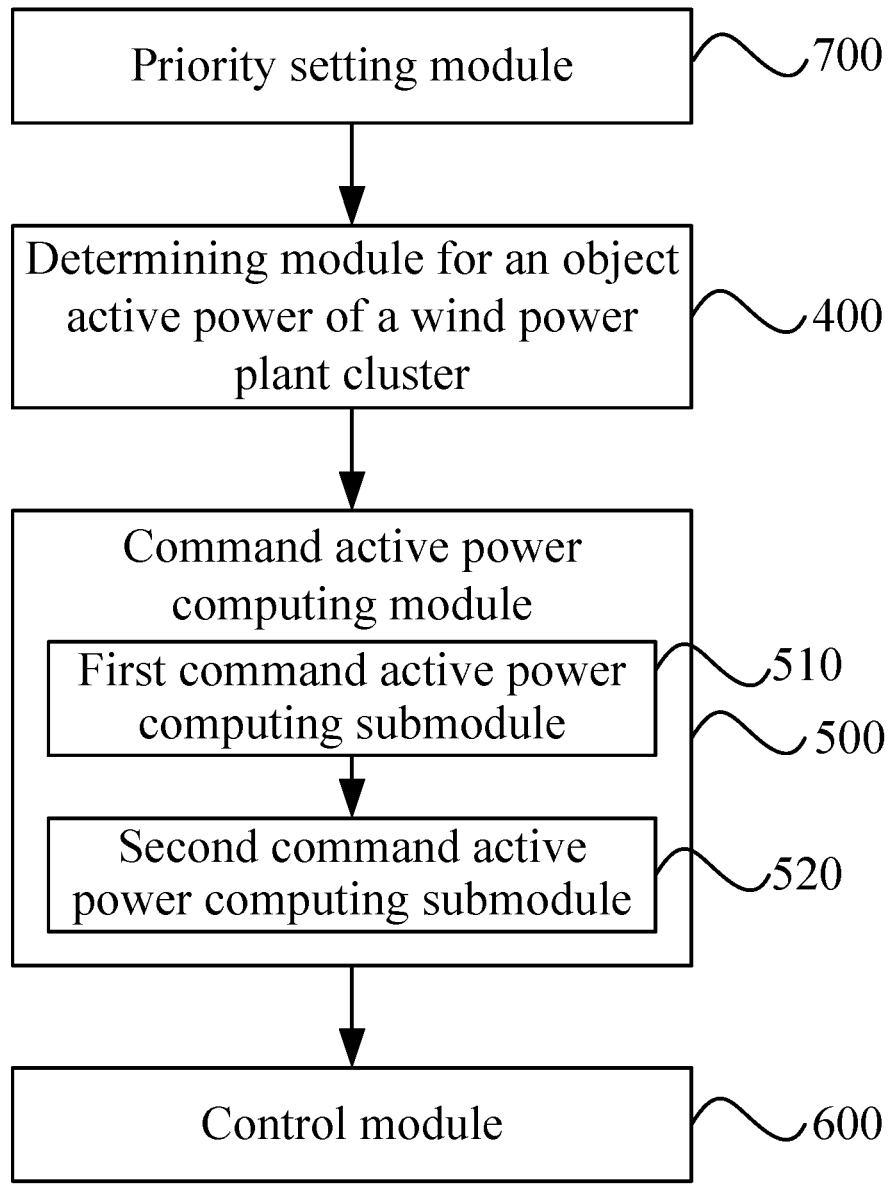
FIG. 6 is a structural diagram illustrating a control device for active power of a wind power plant cluster provided by embodiment 6.

FIG. 6 is a structural diagram illustrating a control device for active power of a wind power plant cluster provided by embodiment 6. Based on above embodiment 4, the present embodiment provides an optional control device for active power of a wind power plant cluster.

Optionally, the determining module 400 for object active power of the wind power plant cluster provided in above embodiment 4 is configured to: monitor the consumption capability of the power grid in real time, and determine object active power of the wind power plant cluster in the (t+1) periods according to a consumption capability of the power grid at the end of the t periods.

Optionally, the command active power computing module 500 provided in above embodiment 3 includes:

a first command active power computing submodule 510, which is configured to set an object active power threshold, if the object active power of the wind power plant cluster is less than or equal to the object active power threshold, the command active power of the wind power plant within each priority is controlled to be equal to 0.

Optionally, the command active power computing module 500 provided in above embodiment 3 further includes:

a second command active power computing submodule 520, which is configured to compute the command active power of each wind power plant within each priority according to the following steps if the object active power of the wind power plant cluster is greater than the object active power threshold:

step 1: for a wind power plant i within the j-th priority, the initial command active power corresponding to the wind power plant i is computed according to the following formula:

$P1_{i,t+1}^{ref} = P1_{i,t}^{real} + \Delta P, \quad i \in Nj, \quad i=1,2, \ldots n, \quad j=1,2, \ldots m;$ where $P1_{i,t+1}^{ref}$ is the initial command active power of the wind power plant i in the j-th priority within a (t+1) period, and $P1_{i,t}^{real}$ is the real active power of the wind power plant i in the j-th priority at the end of the t period; $\Delta P_i$ is a command step length of the wind power plant i in the j-th priority; and Nj is the j-th priority.

Step 2: After initial command active powers of all the wind power plants within a priority are computed, a remaining object active power of wind power plants within the priority behind the above priority is computed according to the following formula:

$$P_{j+1,t+1}^{obj} = P_{t+1}^{obj} - \sum_{i \in N_1 \cup N_2 \cup \ldots \cup N_j} P1_{i,t+1}^{ref},$$

$$i \in Nj, \quad i = 1, 2, \ldots n, \quad j = 1, 2, \ldots m;$$

where $P_{j+1,t+1}^{obj}$ is the remaining object active power of the wind power plants within the priority behind the j-th priority; $P_{t+1}^{obj}$ is the object active power of the wind power plant cluster; and $$\sum_{i \in N_1 \cup N_2 \cup \ldots \cup N_j} P1_{i,t+1}^{ref}$$

is a sum of the initial command active powers of all the wind power plants within the j-th priority and priorities before the j-th priority.

Step 3: comparing the remaining object active power $P_{j+1,t+1}^{obj}$ of the wind power plants of the priority behind the j-th priority with the sum $$\sum_{i \in N_{j+1}} P1_{i,t+1}^{ref}$$

of the initial command active powers of all the wind power plants within the (j+1)-th priority, if $$P_{j+1,t+1}^{obj} \leq \sum_{i \in N_{j+1}} P1_{i,t+1}^{ref},$$

then the command active power of the wind power plants behind the (j+1)-th priority is controlled to be 0; and determining a first command active power of each wind power plant within the (j+1)-th priority according to the following formula:

$$P1_{i,t+1}^{ref'} = \frac{P1_{i,t+1}^{ref}}{\sum_{i \in N_{j+1}} P1_{i,t+1}^{ref}} P_{j+1,t+1}^{obj},$$

$$i \in Nj+1, \quad i = 1, 2, \ldots n, \quad j = 1, 2, \ldots m.$$

where $P1_{i,t+1}^{ref'}$ is the first command active power of the wind power plant i within the (j+1)-th priority; $P1_{i,t+1}^{ref}$ is an initial command active power of the wind power plant i within the (j+1)-th priority;

$$\sum_{i \in N_{j+1}} P1_{i,t+1}^{ref}$$

is the sum of the initial command active powers of all the wind power plants within the (j+1)-th priority; and $P_{j+1,t+1}^{obj}$ is the remaining object active power of the wind power plants of the priority behind the j-th priority.

Step 4: controlling the active power of each wind power plant within the j-th priority and the priority before the j-th priority to be equal to the initial command active power; and the command active power of each of wind power plants within the (j+1)-th priority is controlled to be equal to the first command active power, as shown in the following formulas:

$$P_{i,t+1}^{ref} = P1_{i,t+1}^{ref}; \quad i \in N1 \ldots Nj, \quad i=1,2,\ldots n;$$

$$P_{i,t+1}^{ref} = P1_{i,t+1}^{ref'}; \quad i \in Nj+1, \quad i=1,2,\ldots n;$$

where $P_{i,t+1}^{ref}$ is the command active power of the wind power plant i.

Optionally, the second command computing submodule is further configured to repeat step 1 to step 4 until the remaining object active power of the wind power plants within the priority behind a certain priority is less than the sum of the command active powers of the wind power plants within a next priority of the certain priority.

In the control device provided in the present embodiment, after the consumption capability of the power grid is determined, the active power of each wind power plant within each priority is regulated according to the command step length in the descending order of the priorities, so as to achieve a smooth regulation for the active power in each wind power plant. Thus, after the consumption capability of the power grid is determined, the active power of each wind power plant can be changed and the power generation capability of each wind power plant is fully utilized when peak regulation is difficult.

Embodiment 7

Figure 7:
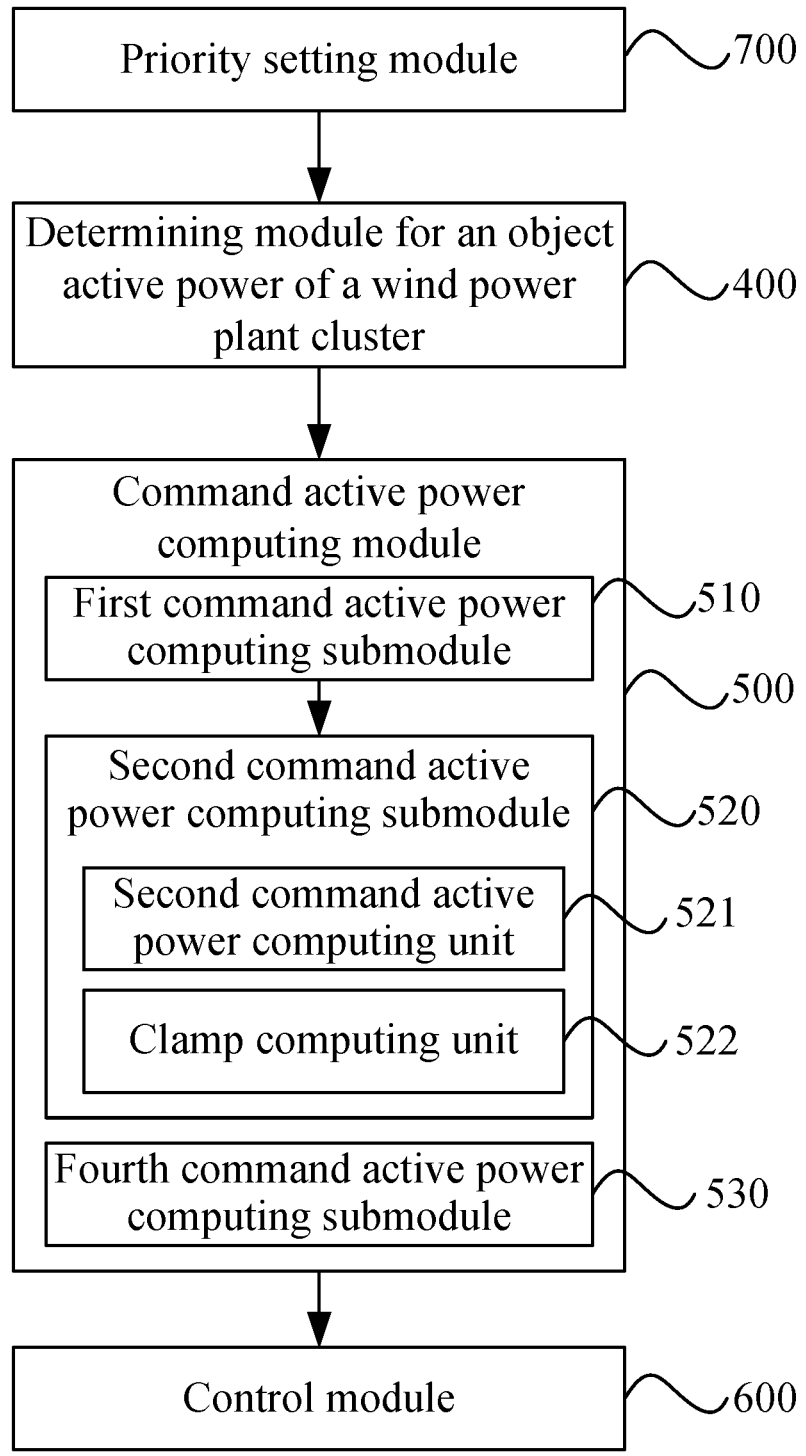
FIG. 7 is a structural diagram illustrating a control device for active power of a wind power plant cluster provided by embodiment 7.

FIG. 7 is a structural schematic diagram illustrating a control device for active power of a wind power plant cluster provided by embodiment 7. The present embodiment is based on above embodiments 4 and 5 and provides an optional control device for active power of a wind power plant cluster.

Optionally, the second command active power computing submodule 520 for provided in embodiment 5 includes:

a second command active power computing unit 521, which is configured to execute:

if the wind power plant cluster includes a section having a section limit and the command active power of each wind power plant within the j-th priority is greater than the section limit within the j-th priority, computing a second command active power of each wind power plant within the j-th priority according to the following formula:

$$P_{i,t+1}^{ref''} = \frac{P_{i,t+1}^{ref}}{\sum_{i \in N_j} P_{i,t+1}^{ref}} \times P_{j,lim}, \quad i = 1, 2, \ldots n, \quad j = 1, 2, \ldots m;$$

where $P_{i,t+1}^{ref''}$ is a second command active power of the wind power plant i within the j-th priority; $P_{i,t+1}^{ref}$ is a command active power of the wind power plant i within the j-th priority computed according to step 1 to step 4;

$$\sum_{i \in N_j} P_{i,t+1}^{ref}$$

is a sum of command active powers of all the wind power plants within the j-th priority; and $P_{j,lim}$ is the section limit within the j-th priority.

The command active power of the wind power plant i within the j-th priority is updated according to the second command active power.

The second command active power computing submodule 520 further includes:

a clamp computing unit 522 configured to set an object active power increasing threshold, if the object active power of the wind power plant cluster is greater than the object active power threshold and a difference between the object active power of the wind power plant cluster in the (t+1) periods and the object active power of the wind power plant cluster in the t periods is greater than the object active power increasing threshold through computation, compare the object active power of the wind power plant cluster in the (t+1) period with a sum of the section limits in the descending order of the priorities; and when the object active power of the wind power plant cluster in the (t+1) period is greater than the sum of section limits within the j-th priority and the priorities before the j-th priority and less than or equal to the sum of section limits within the (j+1)-th priority, clamp the command active powers of the first priority to the j-th priority to the section limits corresponding to each priority and the priorities before the (j+1)-th priority and compute the remaining object active power of the wind power plants within the priorities behind the j-th priority according to the following formula:

$$P_{j+1,t+1}^{obj} = P_{t+1}^{obj} - \sum_{j \in M'} P_{j,lim} - \sum_{j \in M''} \sum_{i \in Nj} P_{i,t+1}^{ref},$$

$$i = 1, 2, \ldots n, \quad j = 1, 2, \ldots m.$$

In the formula, M' is a set of all the sections with the up-regulation capability, and M" is a set of all the sections without the up-regulation capability.

Optionally, the command active power computing module 500 provided in embodiment 4 further includes:

a fourth command active power computing submodule 530, which is configured to acquire the real active power of each wind power plant within each priority in real time before the real active power of each wind power plant within each priority is controlled according to the command active power.

If a sum of the real active powers of each wind power plant within all priorities is greater than the object active power of the wind power plant cluster, the fourth command active power of each wind power plant is computed according to the following formula:

$$P_{i,t+1}^{ref''''} = \frac{P_{i,t+1}^{real}}{\sum_{i \in N} P_{i,t+1}^{real}} \times P_{i,t+1}^{obj}, i = 1, 2, \ldots n, \quad j = 1, 2, \ldots m.$$

Where $P_{i,t+1}^{ref''''}$ is a fourth command active power of the wind power plant i; $P_{i,t+1}^{real}$ is a real active power of the wind power plant i;

$$\sum_{i \in N} P_{i,t+1}^{real}$$

is a sum of real active powers of the wind power plant cluster; and $P_{i,t+1}^{obj}$ is the object active power of the wind power plant cluster.

The command active power of each wind power plant of the wind power plant cluster is updated according to the fourth command active power.

In the control device for active power of the wind power plant cluster provided by embodiments of the present application, on a premise of considering the consumption capability of the power grid, the section limit of the corresponding section within each priority is considered, thereby achieving coordinated control of the active power of the wind power plant under the joint action of peak regulation constraint of the power grid and the section constraint. Moreover, when the consumption capability of the power grid is rapidly increased, it is ensured that the active power of the wind power plant with high priority is increased at first and then the active power of the wind power plant with low priority is increased, thereby avoiding a phenomenon that the wind power plant with low priority rapidly starts and stops the fan when the consumption capability of the power grid is rapidly increased. In addition, when the sum of the real active powers of the wind power plant cluster is greater than the object active power, the command active power is recomputed and the mandatory trigger commands are issued to each wind power plant according to the command active power, thereby avoiding a problem that the total real active power of the wind power plant cluster when a sudden gust appears is greater than the object active power of the wind power plant cluster and a problem of increasing peak regulation difficulty Embodiment 8

Figure 8:
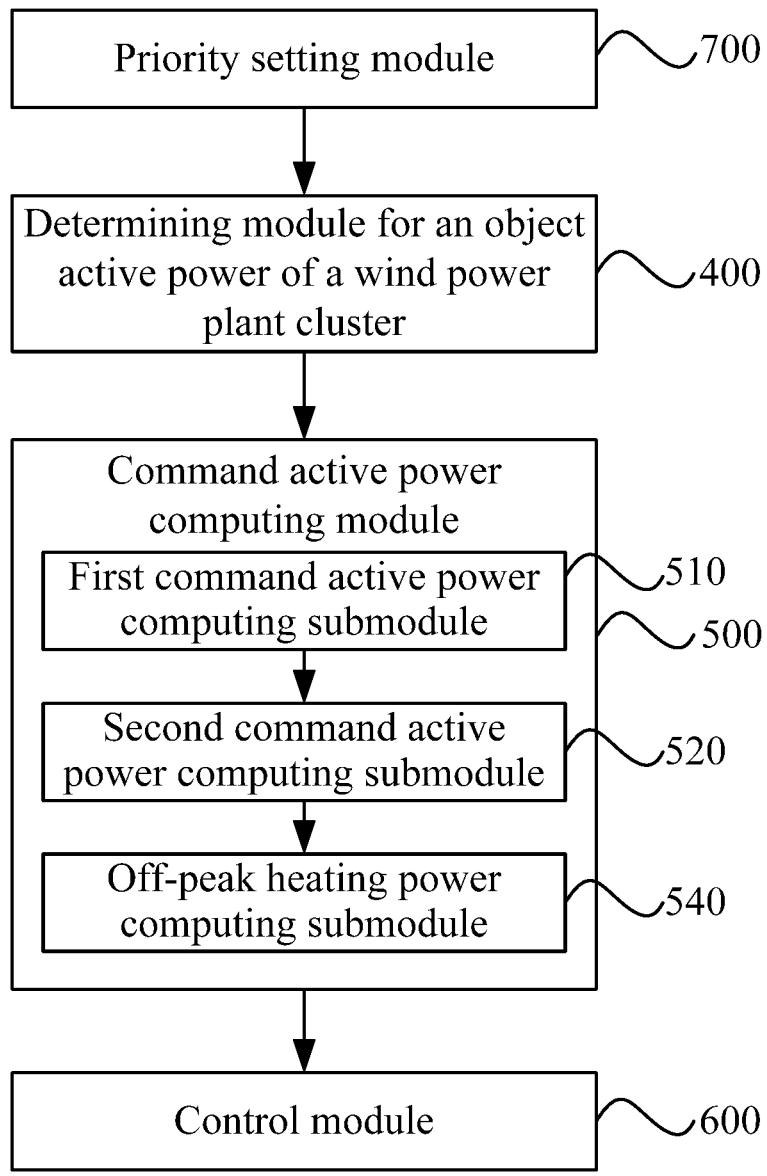
FIG. 8 is a structural diagram illustrating a control device for active power of a wind power plant cluster provided by embodiment 8.

FIG. 8 is a structural schematic diagram illustrating a control device for active power of a wind power plant cluster provided by embodiment 8. Based on above embodiment 6, the present embodiment provides an optional control device for active power of a wind power plant cluster.

In a practical power supply case, some or all of wind power plants in the wind power plant cluster may participate in heating market trade in a off-peak load period. When a wind power plant within the priority participates in the heating market trade of off-peak electricity, electricity trade must be ensured to complete at first, and meanwhile, an increase after the wind power plant participates in the heating electricity trade shall be reflected in command output active power.

Optionally, the command active power computing module 500 further includes: a off-peak heating power computing submodule 540 configured to determine the command active power of the wind power plant within each priority according to the object active power of the wind power plant cluster in the descending order of the priorities if the wind power plant cluster includes a wind power plant which participates in the heating market trade of off-peak electricity, including the following steps:

according to the total electricity of each wind power plant that participates in the heating market trade of off-peak electricity for participating in the heating trade in the current month and hours of off-peak load, computing a reference trading power of the wind power plant through the following formula:

$$L_i = \frac{Q_i}{T};$$

$L_i$ where $L_i$ represents the reference trading power of the wind power plant i in the current month; $Q_i$ represents the total electricity of the wind power plant i that participates in the heating market trade in the current month; and T represents hours of off-peak load of the wind power plant i in the current month.

At the end of each month, the total electricity and off-peak load hours for participating in the heating trade in a next month can be predicted according to historical data. For example, if the total electricity for the heating trade is 3000 MW and the off-peak load hours are 150 hours, then the reference trading power of the wind power plant is 3000/15=20 MW according to the formula (7). Each wind power plant that participates in the heating trade has a certain power supply index. The power supply index may be an active power when the wind power plant participates in the heating trade of off-peak electricity. The active power of the wind power plant is computed according to the power supply index, including the following steps:

Computing a third command active power of the wind power plant that participates in the heating market trade of off-peak electricity according to the following formula:

$$P_{i,t+1}^{ref'''} = P_{i,t+1}^{ref} + L_i;$$

where $P_{i,t+1}^{ref'''}$ is the third command active power of the wind power plant that participates in the heating market trade of off-peak electricity; and $P_{i,t+1}^{ref}$ is the command active power of the wind power plant that participates in the heating market trade of off-peak electricity computed according to step 221 to step 224.

Each of the priorities having one respective section. If the wind power plant cluster includes a section having a section limit, after the command power of each wind power plant is computed, executing the following operation:

if a command active power of each wind power plant within the j-th priority is greater than the section limit within the j-th priority, computing a second command active power of each wind power plant within the j-th priority according to the following formula:

$$P_{i,t+1}^{ref''} = \frac{P_{i,t+1}^{ref}}{\sum_{i \in N_j} P_{i,t+1}^{ref}} \times P_{j,lim}, \quad i = 1, 2, \ldots n, \quad j = 1, 2, \ldots m;$$

where $P_{i,t+1}^{ref''}$ is a second command active power of the wind power plant i within the j-th priority; $P_{i,t+1}^{ref}$ is a command active power of the wind power plant i within the j-th priority computed according to step 221 to step 224;

$$\sum_{i \in N_j} P_{i,t+1}^{ref}$$

is a sum of command active powers of all the wind power plants within the j-th priority; and $P_{j,lim}$ is the section limit within the j-th priority.

The command active power of the wind power plant i within the j-th priority is updated according to the second command active power.

The command active power of the wind power plant that does not participate in the heating market trade of off-peak electricity within each priority is computed.

Before the command active power of the wind power plant that does not participate in the heating market trade of off-peak electricity is computed, the object active power of the wind power plant that does not participate in the heating market trade of off-peak electricity within the priority of the wind power plant that participates in the heating market trade of off-peak electricity is corrected through the following formula:

$$P_{j,t+1}^{obj'} = P_{j,t+1}^{obj} - \sum_{i \in NL} P_{i,t+1}^{ref'''};$$

where $P_{j,t+1}^{obj'}$ is the object active power of the wind power plant that does not participate in the heating market trade of off-peak electricity within the priority of the wind power plant that participates in the heating market trade of off-peak electricity; $P_{j,t+1}^{obj}$ is the object active power of all the wind power plants within the priority of the wind power plant that participates in the heating market trade of off-peak electricity; and NL indicates a set of the wind power plants that participate in the heating market trade of off-peak electricity within the j-th priority.

In the control device for the active power of the wind power plant cluster provided by the present embodiment, on a premise of considering the consumption capability of the power grid, not only the section limit of the corresponding section of each priority is considered, but also the increase after the heating electricity trade is reflected in the command active power of the wind power plant that participates in the heating trade when the wind power plant participates in the heating market trade of off-peak electricity in the load trough period, thereby achieving coordinated control of the active power of the wind power plant under the joint action of peak regulation constraint of the power grid, the section constraint and the market trade.

INDUSTRIAL APPLICATION

The present application provides a control method and device for active power of a wind power plant cluster, so as to control and regulate the active power of each wind power plant according to the consumption capability of the power grid monitored in real time to fully use power generation capability of each wind power plant.

What is claimed is:
1. A control method for active power of a wind power plant cluster, wherein the wind power plant cluster comprises wind power plants of m priorities, wherein m is a positive integer and the control method comprises:
monitoring a consumption capability of a power grid in real time, and determining an object active power of the wind power plant cluster according to the consumption capability of the power grid;
determining a command for the active power of a wind power plant within each of the priorities according to the object active power of the wind power plant cluster in a descending order of the priorities; and controlling the active power of the wind power plant within the each of the priorities according to the command for the active power;

wherein before monitoring the consumption capability of the power grid in real time, and determining the object active power of the wind power plant cluster according to the consumption capability of the power grid, the control method further comprises:

presetting a priority j for each of the wind power plants in the wind power plant cluster, wherein j=1, 2, . . . , m, the priority of the each of the wind power plants is regularly updated; and n wind power plants are comprised in a same priority, wherein n is a positive integer;

wherein the monitoring the consumption capability of the power grid in real time and determining the object active power of the wind power plant cluster according to the consumption capability of the power grid comprises:

monitoring the consumption capability of the power grid in real time, and determining an object active power of the wind power plant cluster within (t+1) periods according to a consumption capability of the power grid at the end of t periods, wherein t is a positive integer;

wherein a step of determining command active power of the wind power plant within the each of the priorities according to the object active power of the wind power plant cluster in a descending order of the priorities comprises:

setting an object active power threshold; and controlling the command active power of the wind power plant within each of the priorities to be equal to 0 if the object active power of the wind power plant cluster is less than or equal to the object active power threshold;

computing the command active power of each wind power plant within each of the priorities according to the following steps if the object active power of the wind power plant cluster is greater than the object active power threshold;

step 1: for a wind power plant i within a j-th priority, computing an initial command active power corresponding to the wind power plant i according to the following formula:

$P1_{i,t+1}^{ref} = P1_{i,t}^{real} + \Delta P_i$, $i \in Nj$, $i=1,2, \ldots, n$, $j=1,2, \ldots, m$;

wherein $P1_{i,t+1}^{ref}$ is the initial command active power of the wind power plant i in the j-th priority within the (t+1) period, and $P1_{i,t}^{real}$ is a real active power of the wind power plant i in the j-th priority at the end of the t periods; $\Delta P_i$ is a command step length of the wind power plant i in the j-th priority, and Nj is the j-th priority;

step 2: computing a remaining object active power of wind power plants within a priority behind the priority according to the following formula after initial command active powers of all the wind power plants within the priority are computed:

$$P_{j+1,t+1}^{obj} = P_{t+1}^{obj} - \sum_{i \in N_1 \cup N_2 \cup \ldots \cup N_j} P1_{i,t+1}^{ref},$$

$i \in Nj$, $i = 1, 2, \ldots n$, $j = 1, 2, \ldots m$;

wherein $P_{j+1,t+1}^{obj}$ is the remaining object active power of the wind power plants within the priority behind the j-th priority; $P_{t+1}^{obj}$ is the object active power of the wind power plant cluster; and $$\sum_{i \in N_1 \cup N_2 \cup \ldots \cup N_j} P1_{i,t+1}^{ref}$$

is a sum of initial command active powers of all the wind power plants within the j-th priority and priorities before the j-th priority;

step 3: comparing the remaining object active power $P_{j+1,t+1}^{obj}$ of the wind power plants of the priority behind the j-th priority with the sum $$\sum_{i \in N_{j+1}} P1_{i,t+1}^{ref}$$

of the initial command active powers of all the wind power plants within the (j+1)-th priority, controlling the command active power of the wind power plants behind the (j+1)-th priority to be 0 if $$P_{j+1,t+1}^{obj} \leq \sum_{i \in N_{j+1}} P1_{i,t+1}^{ref};$$

and determining a first command active power of each of the wind power plants within the (j+1)-th priority according to the following formula:

$$P1_{i,t+1}^{ref'} = \frac{P1_{i,t+1}^{ref}}{\sum_{i \in N_{j+1}} P1_{i,t+1}^{ref}} \times P_{j+1,t+1}^{obj},$$

$i \in Nj+1$, $i = 1, 2, \ldots n$, $j = 1, 2, \ldots m$ wherein $P1_{i,t+1}^{ref'}$ is the first command active power of the wind power plant i within the (j+1)-th priority; $P1_{i,t+1}^{ref}$ is an initial command active power of the wind power plant i within the (j+1)-th priority;

$$\sum_{i \in N_{j+1}} P1_{i,t+1}^{ref}$$

is the sum of initial command active powers of all the wind power plants within the (j+1)-th priority; and $P_{j+1,t+1}^{obj}$ is the remaining object active power of the wind power plants of the priority behind the j-th priority; and step 4: controlling the active power of each of the wind power plants within the j-th priority and the priority before the j-th priority to be equal to the initial command active power; and controlling the command active power of each of the wind power plants within the (j+1)-th priority to be equal to a first command active power, as shown in the following formulas:

$P_{i,t+1}^{ref} = P1_{i,t+1}^{ref}$; $i \in N1 \ldots Nj$, $i=1,2, \ldots n$;

$P_{i,t+1}^{ref} = P1_{i,t+1}^{ref'}$; $i \in Nj+1$, $i=1,2, \ldots n$, wherein $P_{i,t+1}^{ref}$ is the command active power of the wind power plant i.

2. The control method according to claim 1, wherein the wind power plant cluster comprises wind power plants without up-regulation capability, wherein the determining the command active power of the wind power plant within each priority according to the object active power of the wind power plant cluster in the descending order of the priorities further comprises: issuing a fixed command active power to the wind power plants without up-regulation capability.

3. The control method according to claim 2, wherein the control method further comprises: repeatedly executing step 1 to step 4 until the remaining object active power of the wind power plants within the priority behind a certain priority is less than the sum of the command active powers of the wind power plants within a next priority of the certain priority.

4. The control method according to claim 1, wherein each of the priorities has one respective section and the control method further comprises: if the wind power plant cluster comprises a section having a section limit, after a command power of each of the wind power plants is computed, executing:

step 5: if the command active power of each of the wind power plants within the j-th priority is greater than the section limit within the j-th priority, computing a second command active power of each of the wind power plants within the j-th priority according to the following formula:

$$P_{i,t+1}^{ref''} = \frac{P_{i,t+1}^{ref}}{\sum_{i \in N_j} P_{i,t+1}^{ref}} \times P_{j,lim},$$

$$i = 1, 2, \ldots n, j = 1, 2, \ldots m;$$

wherein $P_{i,t+1}^{ref''}$ is a second command active power of the wind power plant i within the j-th priority; $P_{i,t+1}^{ref}$ is a command active power of the wind power plant i within the j-th priority computed according to step 1 to step 4;

$$\sum_{i \in N_j} P_{i,t+1}^{ref}$$

is a sum of command active powers of all the wind power plants within the j-th priority; and $P_{j,lim}$ is the section limit within the j-th priority; and step 6: updating the command active power of the wind power plant i within the j-th priority according to the second command active power.

5. The control method according to claim 4, wherein the determining the command active power of the wind power plant within each of the priorities according to the object active power of the wind power plant cluster in the descending order of the priorities further comprises:

setting an object active power increasing threshold, if the object active power of the wind power plant cluster is greater than the object active power threshold and a difference between the object active power of the wind power plant cluster in the (t+1) periods and the object active power of the wind power plant cluster in the t periods is greater than the object active power increasing threshold through computation, comparing the object active power of the wind power plant cluster in the (t+1) period with a sum of the section limits in the descending order of the priorities, and when the object active power of the wind power plant cluster in the (t+1) periods is greater than the sum of section limits within the j-th priority and the priorities before the j-th priority, and less than or equal to the sum of section limits within the (j+1)-th priority and the priorities before the (j+1)-th priority, clamping the command active powers of a first priority to the j-th priority to the section limits corresponding to each of the priorities and computing a remaining object active power of the wind power plants within the priorities behind the j-th priority according to the following formula:

$$P_{j+1,t+1}^{obj} = P_{t+1}^{obj} - \sum_{j \in M'} P_{j,lim} - \sum_{j \in M''} \sum_{i \in N_j} P_{i,t+1}^{ref},$$

$$i = 1, 2, \ldots n, j = 1, 2, \ldots m$$

wherein M' in the formula is a set of all the sections with the up-regulation capability, and M" is a set of all the sections without the up-regulation capability.

6. The control method according to claim 1, wherein if the wind power plant cluster comprises a wind power plant which participates in heating market trade of off-peak electricity, the determining the command active power of the wind power plant within the each of the priorities according to the object active power of the wind power plant cluster in the descending order of the priorities comprises:

step 7: according to a total electricity of each of the wind power plants that participates in the heating market trade of off-peak electricity for participating in the heating trade in the current month and hours of off-peak load, computing a reference trading power of the wind power plants through following formula:

$$L_i = \frac{Q_i}{T},$$

wherein $L_i$, represents a reference trading power of the wind power plant i in the current month; $Q_i$ represents a total electricity of the wind power plant i that participates in the heating trade in the current month; and T represents hours of off-peak load of the wind power plant i in the current month;

step 8: computing a third command active power of the wind power plant that participates in the heating market trade of off-peak electricity according to the following formula:

$$P_{i,t+1}^{ref'''} = P_{i,t+1}^{ref} + L_i$$

wherein $P_{i,t+1}^{ref'''}$ is the third command active power of the wind power plant that participates in the heating market trade of off-peak electricity; and $P_{i,t+1}^{ref}$ is the command active power of the wind power plant that participates in the heating market trade of off-peak electricity computed according to step 1 to step 4;

step 9: each of the priorities having one respective section; and if the wind power plant cluster comprises a section having a section limit, after the command power of each of the wind power plants is computed, executing the following operation:

if the command active power of each of the wind power plants within the j-th priority is greater than the section limit within the j-th priority, computing a second command active power of each of the wind power plants within the j-th priority according to the following formula:

$$P_{i,t+1}^{ref'} = \frac{P_{i,t+1}^{ref}}{\sum_{i \in N_j} P_{i,t+1}^{ref}} \times P_{j,lim}, i = 1, 2, \ldots n, j = 1, 2, \ldots m;$$

wherein $P_{i,t+1}^{ref'}$ is a second command active power of the wind power plant i within the j-th priority; $P_{i,t+1}^{ref}$ is a command active power of the wind power plant i within the j-th priority computed according to step 1 to step 4;

$$\sum_{i \in N_j} P_{i,t+1}^{ref}$$

is a sum of command active powers of all the wind power plants within the j-th priority; and $P_{j,lim}$ is the section limit within the j-th priority;

updating the command active power of the wind power plant i within the j-th priority according to the second command active power; and step 10: computing a command active power of the wind power plant that does not participate in the heating market trade of off-peak electricity within each of the priorities, wherein before the command active power of the wind power plant that does not participate in the heating market trade of off-peak electricity is computed, an object active power of the wind power plant that does not participate in the heating market trade of off-peak electricity within a priority of the wind power plant that participates in the heating market trade of off-peak electricity is corrected through following formula:

$$P_{j,t+1}^{obj'} = P_{j,t+1}^{obj} - \sum_{i \in NL} P_{i,t+1}^{ref'''}$$

wherein $P_{j,t+1}^{obj'}$ is the object active power of the wind power plant that does not participate in the heating market trade of off-peak electricity within the priority of the wind power plant that participates in the heating market trade of off-peak electricity; $P_{j,t+1}^{obj}$ is an object active power of all the wind power plants within the priority of the wind power plant that participates in the heating market trade of off-peak electricity; and NL represents a set of the wind power plants that participate in the heating market trade of off-peak electricity within the j-th priority.

7. The control method according to claim 1, wherein before the controlling real active power of the wind power plant within each of the priorities according to the command active power, the control method further comprises:

acquiring the real active power of each of wind power plants within each of the priorities in real time;

if a sum of real active powers of the each wind power plant within all priorities is greater than the object active power of the wind power plant cluster, computing a fourth command active power of the each of the wind power plants according to the following formula:

$$P_{i,t+1}^{ref''''} = \frac{P_{i,t+1}^{real}}{\sum_{i \in N} P_{i,t+1}^{real}} \times P_{i,t+1}^{obj}, i = 1, 2, \ldots n, j = 1, 2, \ldots m$$

wherein $P_{i,t+1}^{ref''''}$ is a fourth command active power of the wind power plant i; $P_{i,t+1}^{real}$ is a real active power of the wind power plant i;

$$\sum_{i \in N} P_{i,t+1}^{real}$$

is a sum of real active powers of the wind power plant cluster; and $P_{i,t+1}^{obj}$ is the object active power of the wind power plant cluster; and updating the command active power of each of the wind power plants of the wind power plant cluster according to the fourth command active power.

8. A control device for active power of a wind power plant cluster, wherein the wind power plant cluster comprises wind power plants of m priorities, wherein m is a positive integer and the control device comprises:

a determining module for object active power of the wind power plant cluster, which is configured to monitor a consumption capability of a power grid in real time and determine the object active power of the wind power plant cluster according to the consumption capability of the power grid;

a command active power computing module, which is configured to determine a command for the active power of a wind power plant within each of the priories according to the object active power of the wind power plant cluster in a descending order of the priorities; and a control module, which is configured to the active power of the wind power plant within each of priorities according to the command for the active power;

wherein the control device further comprises a priority setting module configured to preset the priority j for each of the wind power plants in the wind power plant cluster, wherein j=1, 2, . . . m, the priority of the each of the wind power plants is regularly updated and the same priority comprises n wind power plants, wherein n is a positive integer;

wherein the determining module for the object active power of the wind power plant cluster is configured to: monitor the consumption capability of the power grid in real time, and determine object active power of the wind power plant cluster in a (t+1) period according to a consumption capability of the power grid at the end of the t periods;

wherein the computing module for a command active power comprises:

a first command active power computing submodule, which is configured to set an object active power threshold, wherein if the object active power of the wind power plant cluster is less than or equal to the object active power threshold, the command active power of the wind power plant within each of the priorities is controlled to be equal to 0;

a second command active power computing submodule, which is configured to compute the command active power of each wind power plant within each of the priorities according to the following steps if the object active power of the wind power plant cluster is greater than the object active power threshold:

step 1: for a wind power plant i within the j-th priority, computing an initial command active power corresponding to the wind power plant i according to the following formula:

$$P1_{i,t+1}^{ref} = P1_{i,t}^{real} + \Delta P_i, i \in Nj, i=1,2,\ldots n, j=1,2,\ldots m;$$

wherein $P1_{i,t+1}^{ref}$ is the initial command active power of the wind power plant i in the j-th priority within the (t+1) period, and $P1_{i,t}^{real}$ is the real active power of the wind power plant i in the j-th priority at the end of the t period; $\Delta P_i$ is a command step length of the wind power plant i in the j-th priority; and Nj is the j-th priority;

step 2: after initial command active powers of all the wind power plants within a priority are computed, computing a remaining object active power of wind power plants within a priority behind the above priority according to the following formula:

$$P_{j+1,t+1}^{obj} = P_{t+1}^{obj} - \sum_{i \in N_1 \cup N_2 \cup \ldots \cup N_j} P1_{i,t+1}^{ref},$$

$$i \in Nj, i = 1, 2, \ldots n, j = 1, 2, \ldots m;$$

wherein $P_{j+1,t+1}^{obj}$ is the remaining object active power of the wind power plants within the priority behind the j-th priority; $P_{t+1}^{obj}$ is the object active power of the wind power plant cluster; and $$\sum_{i \in N_1 \cup N_2 \cup \ldots \cup N_j} P1_{i,t+1}^{ref}$$

is a sum of the initial command active powers of all the wind power plants within the j-th priority and priorities before the j-th priority, step 3: comparing the remaining object active power $P_{j+1,t+1}^{obj}$ of the wind power plants of the priority behind the j-th priority with the sum $$\sum_{i \in N_{j+1}} P1_{i,t+1}^{ref}$$

of the initial command active powers of all the wind power plants within the (j+1)-th priority; controlling the command active power of the wind power plants behind the (j+1)-th priority to be 0 if $$P_{j+1,t+1}^{obj} \leq \sum_{i \in N_{j+1}} P1_{i,t+1}^{ref};$$

and determining a first command active power of each of the wind power plants within the (j+1)-th priority according to the following formula:

$$P1_{i,t+1}^{ref'} = \frac{P1_{i,t+1}^{ref}}{\sum_{i \in N_{j+1}} P1_{i,t+1}^{ref}} \times P_{j+1,t+1}^{obj},$$

$$i \in Nj+1, i = 1, 2, \ldots n, j = 1, 2, \ldots m$$

wherein $P1_{i,t+1}^{ref'}$ is the first command active power of the wind power plant i within the (j+1)-th priority; $P1_{i,t+1}^{ref}$ is an initial command active power of the wind power plant i within the (j+1)-th priority;

$$\sum_{i \in N_{j+1}} P1_{i,t+1}^{ref}$$

is the sum of initial command active powers of all the wind power plants within the (j+1)-th priority; and $P_{j+1,t+1}^{obj}$ is the remaining object active power of the wind power plants of the priority behind the j-th priority; and step 4: controlling the active power of each of the wind power plants within the j-th priority and the priority before the j-th priority to be equal to the initial command active power; and controlling the command active power of each wind power plant within the (j+1)-th priority to be equal to a first command active power, as shown in the following formulas:

$$P_{i,t+1}^{ref} = P1_{i,t+1}^{ref}; i \in N1 \ldots Nj, i=1,2,\ldots n;$$

$$P_{i,t+1}^{ref} = P1_{i,t+1}^{ref'}; i \in Nj+1, i=1,2,\ldots n,$$

wherein $P_{i,t+1}^{ref}$ is the command active power of the wind power plant i.

9. The control device according to claim 8, wherein each of the priorities has one respective section and the second command active power computing submodule for comprises:

a second command active power computing unit, which is configured to execute:

step 5: if the wind power plant cluster comprises a section having a section limit and the command active power of each of the wind power plants within the j-th priority is greater than the section limit within the j-th priority, computing a second command active power of each of the wind power plants within the j-th priority according to the following formula;

$$P_{i,t+1}^{ref''} = \frac{P_{i,t+1}^{ref}}{\sum_{i \in N_j} P_{i,t+1}^{ref}} \times P_{j,lim}, i = 1, 2, \ldots n, j = 1, 2, \ldots m;$$

wherein $P_{i,t+1}^{ref''}$ is a second command active power of the wind power plant i within the j-th priority; $P_{i,t+1}^{ref}$ is a command active power of the wind power plant i within the j-th priority computed according to step 1 to step 4;

$$\sum_{i \in N_j} P_{i,t+1}^{ref}$$

is a sum of command active powers of all the wind power plants within the j-th priority; and $P_{j,lim}$ is the section limit within the j-th priority; and step 6: updating the command active power of the wind power plant i within the j-th priority according to the second command active power.

10. The control device according to claim 9, wherein the second command active power computing submodule further comprises:
    a clamp computing unit configured to: set an object active power increasing threshold; if the object active power of the wind power plant cluster is greater than the object active power threshold and a difference between the object active power of the wind power plant cluster in the (t+1) period and the object active power of the wind power plant cluster in the t period is greater than the object active power increasing threshold through computation, compare the object active power of the wind power plant cluster in the (t+1) period with a sum of the section limits in the descending order of the priorities; and when the object active power of the wind power plant cluster in the (t+1) period is greater than the sum of section limits within the j-th priority and the priorities before the j-th priority and less than or equal to the sum of section limits within the (j+1)-th priority and the priorities before the (j+1)-th priority, clamp the command active powers of a first priority to the j-th priority to the section limits corresponding to each of the priorities and compute the remaining object active power of the wind power plants within the priorities behind the j-th priority according to the following formula:

$$P_{j+1,t+1}^{obj} = P_{t+1}^{obj} - \sum_{j \in M'} P_{j,lim} - \sum_{j \in M''} \sum_{i \in N_j} P_{i,t+1}^{ref},$$

$$i = 1, 2, \ldots n, \ j = 1, 2, \ldots m$$

wherein in the formula, M' is a set of all the sections with the up-regulation capability, and M" is a set of all the sections without the up-regulation capability.

11. The control device according to claim 8, wherein the computing module for a command active power further comprises: a power computing submodule for off-peak electricity used in heating, which is configured to compute the command active power of each of the wind power plants according to the following step if the wind power plant cluster comprises a wind power plant which participates in the heating market trade of off-peak electricity:

step 7: according to a total electricity of each of the wind power plants that participates in the heating market trade of off-peak electricity for participating in the heating trade in the current month and hours of load trough, computing a reference trading power of the wind power plant through following formula:

$$L_i = \frac{Q_i}{T};$$

wherein $L_i$ represents a reference trading power of the wind power plant i in the current month; $Q_i$ represents a total electricity of the wind power plant i that participates in the heating market trade in the current month; and T represents hours of off-peak load of the wind power plant i in the current month;

step 8: computing a third command active power of the wind power plant that participates in the heating market trade of off-peak electricity according to the following formula:

$$P_{i,t+1}^{ref'''} = P_{i,t+1}^{ref} + L_i$$

wherein $P_{i,t+1}^{ref'''}$ is the third command active power of the wind power plant that participates in the heating market trade of off-peak electricity; and $P_{i,t+1}^{ref}$ is the command active power of the wind power plant that participates in the heating market trade of off-peak electricity computed according to step 1 to step 4;

step 9: each of the priorities having one respective section; and if a wind power plant cluster comprises a section having a section limit after the command power of each of the wind power plants is computed, executing the following operation:

if a command active power of each of the wind power plants within the j-th priority is greater than the section limit within the j-th priority, computing a second command active power of each of the wind power plants within the j-th priority according to the following formula:

$$P_{i,t+1}^{ref''} = \frac{P_{i,t+1}^{ref}}{\sum_{i \in N_j} P_{i,t+1}^{ref}} \times P_{j,lim}, \ i = 1, 2, \ldots n, \ j = 1, 2, \ldots m$$

wherein $P_{i,t+1}^{ref''}$ is a second command active power of the wind power plant i within the j-th priority; $P_{i,t+1}^{ref}$ is a command active power of the wind power plant i within the j-th priority computed according to step 1 to step 4;

$$\sum_{i \in N_j} P_{i,t+1}^{ref}$$

is a sum of command active powers of all the wind power plants within the j-th priority; and $P_{j,lim}$ is the section limit within the j-th priority;

updating the command active power of the wind power plant i within the j-th priority according to the second command active power; and step 10: computing a command active power of the wind power plant that does not participate in the heating market trade of off-peak electricity within each of the priorities, wherein before the command active power of the wind power plant that does not participate in the heating market trade of off-peak electricity is computed, an object active power of the wind power plant that does not participate in the heating market trade of off-peak electricity within a priority of the wind power plant that participates in the heating market trade of off-peak electricity is corrected through following formula:

$$P_{j,t+1}^{obj'} = P_{j,t+1}^{obj} - \sum_{i \in NL} P_{i,t+1}^{ref'''}$$

wherein $P_{j,t+1}^{obj'}$ is the object active power of the wind power plant that does not participate in the heating market trade of off-peak electricity within the priority of the wind power plant that participates in the heating market trade of off-peak electricity; $P_{j,t+1}^{obj}$ is an object active power of all the wind power plants within the priority of the wind power plant that participates in the heating market trade of off-peak electricity; and NL represents a set of the wind power plants that participate in the heating market trade of off-peak electricity within the j-th priority.

12. The control device according to claim 8, wherein the computing module for a command active power further comprises:
   a fourth computing submodule for a command active power, which is configured to acquire the real active power of the each of wind power plants within each of the priorities in real time before the real active power of the each of wind power plants within each priority is controlled according to the command active power;
   wherein if a sum of the real active powers of the each of the wind power plants within all priorities is greater than the object active power of the wind power plant cluster, a fourth command active power of the each of the wind power plants is computed according to the following formula:

$$P_{i,t+1}^{ref''''} = \frac{P_{i,t+1}^{real}}{\sum_{i \in N} P_{i,t+1}^{real}} \times P_{i,t+1}^{obj},$$

$$i = 1, 2, \ldots n, \ j = 1, 2, \ldots m$$

wherein $P_{i,t+1}^{ref''''}$ is a fourth command active power of the wind power plant i; $P_{i,t+1}^{real}$ is a real active power of the wind power plant i;

$$\sum_{i \in N} P_{i,t+1}^{real}$$

is a sum of real active powers of the wind power plant cluster; and $P_{i,t+1}^{obj}$ is the object active power of the wind power plant cluster; and the command active power of the each of the wind power plants in the wind power plant cluster is updated according to the fourth command active power.

* * * * *